(12) United States Patent
Hashimoto et al.

(10) Patent No.: US 10,033,021 B2
(45) Date of Patent: Jul. 24, 2018

(54) PACKAGING MATERIAL FOR CELL

(71) Applicant: DAI NIPPON PRINTING CO., LTD., Tokyo (JP)

(72) Inventors: Yohei Hashimoto, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 104 days.

(21) Appl. No.: 15/023,287

(22) PCT Filed: Sep. 18, 2014

(86) PCT No.: PCT/JP2014/074658
§ 371 (c)(1),
(2) Date: Mar. 18, 2016

(87) PCT Pub. No.: WO2015/041281
PCT Pub. Date: Mar. 26, 2015

(65) Prior Publication Data
US 2016/0211490 A1 Jul. 21, 2016

(30) Foreign Application Priority Data

Sep. 20, 2013 (JP) ................................ 2013-195690
Sep. 26, 2013 (JP) ................................ 2013-199883
(Continued)

(51) Int. Cl.
*H01M 4/02* (2006.01)
*H01M 2/02* (2006.01)
(Continued)

(52) U.S. Cl.
CPC ............ *H01M 2/0292* (2013.01); *B32B 7/14* (2013.01); *B32B 15/08* (2013.01); *B32B 15/20* (2013.01);
(Continued)

(58) Field of Classification Search
CPC ...................................................... H01M 2/04
See application file for complete search history.

(56) References Cited

U.S. PATENT DOCUMENTS 6,461,757 B1  10/2002  Sasayama et al.
2002/0142178 A1  10/2002  Yamashita et al.
(Continued)

FOREIGN PATENT DOCUMENTS

CN    1252896 A    5/2000
CN    105144422 A   12/2015
(Continued)

OTHER PUBLICATIONS

Nov. 4, 2016 Search Report issued in European Patent Application No. 14846379.7.
(Continued)

*Primary Examiner* — Jacob B Marks
(74) *Attorney, Agent, or Firm* — Oliff PLC

(57) ABSTRACT

A packaging material for a cell including a laminated article having at least a coating layer, a barrier layer, and a sealant layer in the stated order, wherein: the coating layer has at least three layers including a first, second and third coating layer, and is disposed so that the first coating layer is positioned as the outermost layer and the third coating layer is positioned on the barrier-layer-side; and the first coating layer, the second coating layer, and the third coating layer are formed from a cured product of a resin composition containing a heat-curing resin and a curing accelerator so as to sufficiently exhibit a specific hardness, whereby the thickness can be reduced, exceptional chemical resistance, moldability, and inter-layer adhesion between the barrier layer and the coating layer can be obtained, and the lead time can be reduced to enable an improvement in production efficiency.

26 Claims, 2 Drawing Sheets

(30) Foreign Application Priority Data

Mar. 31, 2014 (JP) .................................. 2014-071369
Mar. 31, 2014 (JP) .................................. 2014-071372

(51) Int. Cl.
| | |
|---|---|
| *B32B 37/24* | (2006.01) |
| *H01M 2/08* | (2006.01) |
| *B32B 27/20* | (2006.01) |
| *B32B 37/02* | (2006.01) |
| *B32B 7/14* | (2006.01) |
| *B32B 15/08* | (2006.01) |
| *B32B 15/20* | (2006.01) |
| *B32B 27/26* | (2006.01) |
| *B32B 27/28* | (2006.01) |
| *B32B 27/30* | (2006.01) |
| *B32B 27/36* | (2006.01) |
| *B32B 27/38* | (2006.01) |
| *B32B 27/40* | (2006.01) |
| *B32B 27/42* | (2006.01) |
| *B32B 38/00* | (2006.01) |

(52) U.S. Cl.
CPC .............. *B32B 27/20* (2013.01); *B32B 27/26* (2013.01); *B32B 27/28* (2013.01); *B32B 27/308* (2013.01); *B32B 27/36* (2013.01); *B32B 27/38* (2013.01); *B32B 27/40* (2013.01); *B32B 27/42* (2013.01); *B32B 37/02* (2013.01); *B32B 37/24* (2013.01); *H01M 2/0275* (2013.01); *H01M 2/0277* (2013.01); *H01M 2/0287* (2013.01); *H01M 2/08* (2013.01); *B32B 2037/243* (2013.01); *B32B 2038/0076* (2013.01); *B32B 2255/10* (2013.01); *B32B 2255/26* (2013.01); *B32B 2264/025* (2013.01); *B32B 2264/0292* (2013.01); *B32B 2264/10* (2013.01); *B32B 2270/00* (2013.01); *B32B 2274/00* (2013.01); *B32B 2307/4026* (2013.01); *B32B 2307/51* (2013.01); *B32B 2307/54* (2013.01); *B32B 2307/732* (2013.01); *B32B 2307/746* (2013.01); *B32B 2363/00* (2013.01); *B32B 2375/00* (2013.01); *B32B 2379/00* (2013.01); *B32B 2457/10* (2013.01); *B32B 2597/00* (2013.01); *H01M 2002/0297* (2013.01)

(56) References Cited

U.S. PATENT DOCUMENTS

| | | | |
|---|---|---|---|
| 2011/0217512 | A1 | 9/2011 | Heishi et al. |
| 2012/0135301 | A1* | 5/2012 | Akita ............... H01M 2/0212 429/185 |
| 2012/0219838 | A1* | 8/2012 | Terada ............. H01M 10/0413 429/120 |
| 2013/0026223 | A1 | 1/2013 | Murray et al. |
| 2013/0095380 | A1* | 4/2013 | Affinito ................ H01M 4/13 429/207 |
| 2014/0072864 | A1 | 3/2014 | Suzuta et al. |
| 2014/0078422 | A1 | 3/2014 | Tanabe et al. |
| 2014/0335403 | A1 | 11/2014 | Akita et al. |
| 2016/0049621 | A1 | 2/2016 | Hashimoto et al. |

FOREIGN PATENT DOCUMENTS

| | | |
|---|---|---|
| EP | 2641736 A1 | 9/2013 |
| JP | 2001-202927 A | 7/2001 |
| JP | 2002056823 A | 2/2002 |
| JP | 2006-342238 A | 12/2006 |
| JP | 2011-054563 A | 3/2011 |
| JP | 2011-187386 A | 9/2011 |
| JP | 2012-013963 A | 1/2012 |
| JP | 2012-035631 A | 2/2012 |
| JP | 2013-122898 A | 6/2013 |
| JP | 2013-149397 A | 8/2013 |
| WO | 2004/048085 A1 | 6/2004 |
| WO | 2012/067194 A1 | 5/2012 |
| WO | 2012/153677 A1 | 11/2012 |
| WO | 2012/153847 A1 | 11/2012 |
| WO | 2013/069730 A1 | 5/2013 |
| WO | 2014/156904 A1 | 10/2014 |
| WO | 2014/156905 A1 | 10/2014 |

OTHER PUBLICATIONS

Nov. 4, 2014 International Search Report issued in International Patent Application No. PCT/JP2014/074658.
Apr. 27, 2018 Office Action issued in Chinese Application No. 201480051863.X.

* cited by examiner

PACKAGING MATERIAL FOR CELL

TECHNICAL FIELD

The first aspect A of the present invention relates to a film-shaped battery packaging material which is made thin by providing a coating layer as an outermost layer on a barrier layer, the battery packaging material being capable of reducing the lead time.

The second aspect B of the present invention relates to a film-shaped battery packaging material which is made thin by providing a coating layer as an outermost layer on a barrier layer, the battery packaging material having excellent moldability and being capable of reducing the lead time.

BACKGROUND ART

Various types of batteries have been developed heretofore, and in every battery, a packaging material is an essential member for sealing battery elements such as an electrode and an electrolyte. Metallic packaging materials have been often used heretofore as battery packagings.

On the other hand, batteries are required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, a film-shaped laminated body including a base material layer, an adhesive layer, a barrier layer and a sealant layer in this order has been proposed as a battery packaging material which is easily processed into diverse shapes and which can be thinned and lightened (see, for example, Patent Document 1). The film-shaped battery packaging material is formed in such a manner that a battery element can be sealed by heat-welding the peripheral edge by heat sealing with the sealant layers facing each other.

On the other hand, in recent years, demand for downsizing and thinning of batteries has been increasingly grown, and in conformity to the demand, further thinning of film-shaped battery packaging materials has been required. Examples of the method for thinning the whole of a film-shaped battery packaging material include a method in which a base material layer including a resin film having a thickness of about 10 to 20 µm is thinned. However, thinning of the resin film has limitations in terms of production, and also has the problem that the processing cost required for thinning of the resin film causes an increase in production cost of a battery packaging material.

A coating layer formed by applying a thermosetting resin can be considerably reduced in thickness as compared to the resin film, and therefore replacement of an adhesive layer and a base material layer, which are laminated on a barrier layer, by a coating layer formed of a thermosetting resin is effective for thinning the whole of a film-shaped battery packaging material. When a coating layer is provided in place of an adhesive layer and a base material layer as described above, the coating layer is required to have a thickness which ensures that insulation quality can be imparted for securing the basic performance of the coating layer. Examples of the method for providing a coating layer, which can impart insulation quality, on a barrier layer using a conventional technique include a method in which a barrier layer is thickly coated with a thermosetting resin, and a method in which a barrier layer is thinly coated with a thermosetting resin repeatedly over a plurality of times to laminate a plurality of coating layers on the barrier layer. However, the former method has the disadvantage that bubbles are easily generated in the coating layer due to the thick coating, so that it is difficult to form a coating layer free from pinholes. Both the former and latter methods have the problem that when a coating layer is formed using a thermosetting resin using a conventional technique, it is required to perform aging under a high-temperature condition for several days to several weeks as a curing step, and therefore the lead time is increased, so that product defects occur due to exposure to a high-temperature condition and a temperature change for a long period of time. Particularly, the latter method is not practical because for forming a plurality of coating layers, it is necessary to carry out a curing step over a plurality of times, so that a very long lead time is needed.

Further, when a coating layer is provided as an outermost layer in place of an adhesive layer and a base material layer in a film-shaped battery packaging material, it is also important that the coating layer has resistance to deposition of chemicals such as an electrolytic solution, an acid, an alkali and an organic solvent (chemical resistance) as basic performance in addition to insulation quality. It is also important that the film-shaped battery packaging material has excellent moldability and its surface has slippage for improving moldability/processability in press molding and embossing, and operability.

In view of these conventional techniques, it is earnestly desired to develop a battery packaging material which is made thin by providing a coating layer as an outermost layer on a barrier layer, the battery packaging material being capable of reducing the lead time, and capable of being given functionalities such as moldability, chemical resistance and slippage.

In recent years, there has been no shortage of demand for further improvement of battery performance, and accordingly, it has been required to increase the battery capacity. A film-shaped battery packaging material is processed into a predetermined shape by deep drawing molding etc. to seal a battery element, and therefore for increasing the battery package, the moldability of the film-shaped battery packaging material should be improved to increase the molding depth (extension during molding).

In view of these conventional techniques, a technique has been developed for achieving excellent moldability and reducing the lead time in a battery packaging material which is made thin by providing a coating layer in place of an adhesive layer and a base material layer.

PRIOR ART DOCUMENT

Patent Document

Patent Document 1: Japanese Patent Laid-open Publication No. 2001-202927

SUMMARY OF THE INVENTION

Problems to be Solved by the Invention

An object of the first aspect A of the present invention is to provide a film-shaped battery packaging material which is made thin by providing a coating layer as an outermost layer in place of an adhesive layer and a base material layer in a conventional film-shaped battery packaging material, the film-shaped battery packaging material being capable of reducing the lead time.

An object of the second aspect B of the present invention is to provide a film-shaped battery packaging material which is made thin by providing a coating layer as an outermost layer in place of an adhesive layer and a base material layer in a conventional film-shaped battery packaging material, the film-shaped battery packaging material having excellent moldability and being capable of reducing the lead time.

Means for Solving the Problems

In the first aspect A, the present inventors have extensively conducted studies for achieving the above-mentioned object, and resultantly found that when in a battery packaging material which includes a laminated body including at least a coating layer, a barrier layer and a sealant layer in this order, the coating layer has a multilayer structure having two or more layers, and the layers that form the coating layer are each formed of a cured product of a resin composition containing a thermosetting resin and a curing accelerator, the battery packaging material can be made thin, and efficiently produced by reducing the lead time.

The present inventors have also found that when the elastic modulus of the layers that form the coating layer is 1500 to 6000 MPa in the battery packaging material of the first aspect A, the battery packaging material has excellent moldability. Further, the present inventors have found that when at least one layer in the coating layer is 2500 to 6000 MPa, the battery packaging material also has excellent chemical resistance. The present inventors have also found that when the layer situated on the outermost side in the coating layer contains a slipping agent, particularly a reactive slipping agent, excellent slippage can be imparted.

The present inventors have also found that when in the first aspect A, at least one layer in the coating layer in the battery packaging material having the above-mentioned configuration contains a pigment and/or dye, discriminability can be imparted to the battery packaging material, and the heat conductivity can be increased to improve the heat dissipation property.

The first aspect A of the present invention has been completed by further conducting studies based on the above-mentioned findings.

In the second aspect B, the present inventors have extensively conducted studies for achieving the above-mentioned object, and resultantly found that when in a battery packaging material which includes a laminated body including at least a coating layer, a barrier layer and a sealant layer in this order, the coating layer is configured to have a single layer or multiple layers formed of a cured product of a resin composition containing a thermosetting resin and a curing accelerator, and the resin composition to be used for formation of at least one layer in the coating layer contains reactive resin beads, moldability can be improved, and the lead time can be reduced. Further, the present inventors have found that when at least one layer in the coating layer in the battery packaging material having the above-mentioned configuration contains a pigment and/or dye, discriminability can be imparted to the battery packaging material, and the heat conductivity can be increased to improve the heat dissipation property. The second aspect B of the present invention has been completed by further conducting studies based on the above-mentioned findings.

That is, the first aspect A and the second aspect B of the present invention provide an invention of the aspects described below.

(First Aspect A)

Item 1A. A battery packaging material which includes a laminated body including at least a coating layer, a barrier layer and a sealant layer in this order, wherein
the coating layer has a multilayer structure having two or more layers, and
the layers that form the coating layer are each formed of a cured product of a resin composition containing a thermosetting resin and a curing accelerator.

Item 2A. The battery packaging material according to item 1A, wherein the layers that form the coating layer each have an elastic modulus of 1500 to 6000 MPa.

Item 3A. The battery packaging material according to item 1A or 2A, wherein at least one of the layers that form the coating layer has an elastic modulus of 2500 to 6000 MPa.

Item 4A. The battery packaging material according to any one of items 1A to 3A, wherein the coating layer has a two-layer structure, and
among the layers that form the coating layer, the layer that is in contact with the barrier layer has an elastic modulus of 1500 to 6000 MPa, and the outermost layer has an elastic modulus of 3000 to 6000 MPa.

Item 5A. The battery packaging material according to any one of items 1A to 3A, wherein the coating layer has a three-layer structure, and
among the layers that form the coating layer, the layer that is in contact with the barrier layer has an elastic modulus of 1500 to 6000 MPa, the layer positioned in the middle between the layer that is in contact with the barrier layer and the outermost layer has an elastic modulus of 1500 to 6000 MPa, and the outermost layer has an elastic modulus of 3000 to 6000 MPa.

Item 6A. The battery packaging material according to any one of items 1A to 5A, wherein in the coating layer, the outermost layer is formed of a cured product of a resin composition containing a thermosetting resin, a curing accelerator and a slipping agent.

Item 7A. The battery packaging material according to any one of items 1A to 6A, wherein the resin composition to be used for formation of at least one layer in the coating layer contains a pigment and/or dye.

Item 8A. The battery packaging material according to item 7A, wherein the resin composition to be used for formation of at least one layer in the coating layer contains an inorganic pigment.

Item 9A. The battery packaging material according to any one of items 1A to 8A, wherein the layers that form the coating layer each have a thickness of 1 to 5 μm.

Item 10A. The battery packaging material according to any one of items 1A to 9A, wherein the battery packaging material has a thickness of 40 to 120 μm as a whole.

Item 11A. The battery packaging material according to any one of items 1A to 10A, wherein the thermosetting resin is at least one selected from the group consisting of an epoxy resin, an amino resin, an acrylic resin, a urethane resin, a phenol resin, an unsaturated polyester resin and an alkyd resin.

Item 12A. The battery packaging material according to any one of items 1A to 11A, wherein the curing accelerator is at least one selected from the group consisting of an amidine compound, a carbodiimide compound, a ketimine compound, a hydrazine compound, a sulfonium salt, a benzothiazolium salt and a tertiary amine compound.

Item 13A. A method for producing a battery packaging material,
the method including a coating layer forming step of applying a resin composition, which contains a thermosetting resin and a curing accelerator, to a barrier layer and heating and thereby curing the resin composition repeatedly two or more times to form on the barrier layer a coating layer having a multilayer structure having two or more layers, wherein before, during or after the coating layer forming step, a sealant layer is laminated on a surface of the barrier layer on a side opposite to a surface on which the coating layer is laminated.

Item 14A. A battery, wherein a battery element including at least a positive electrode, a negative electrode and an electrolyte is stored in the battery packaging material according to any one of items 1A to 12A.

(Second Aspect B)

Item 1B. A battery packaging material which includes a laminated body including at least a coating layer, a barrier layer and a sealant layer in this order, wherein the coating layer includes a single layer or multiple layers formed of a cured product of a resin composition containing a thermosetting resin and a curing accelerator, and the resin composition to be used for formation of at least one layer in the coating layer contains reactive resin beads.

Item 2B. A battery packaging material according to item 1B, wherein the coating layer has a three-layer structure in which a first coating layer, a second coating layer and a third coating layer are arranged in this order from the outermost surface side toward the barrier layer side, and the resin composition to be used for formation of the second coating layer contains the reactive resin beads.

Item 3B. The battery packaging material according to item 1B or 2B, wherein the reactive resin beads are urethane resin beads or acrylic resin beads having a functional group.

Item 4B. The battery packaging material according to any one of items 1B to 3B, wherein the refractive index of the reactive resin beads is 1.3 to 1.8.

Item 5B. The battery packaging material according to any one of items 1B to 4B, wherein the resin composition to be used for formation of at least one layer in the coating layer contains a pigment and/or dye.

Item 6B. The battery packaging material according to item 5B, wherein the resin composition to be used for formation of at least one layer in the coating layer contains an inorganic pigment.

Item 7B. The battery packaging material according to any one of items 1B to 6B, wherein the thermosetting resin is at least one selected from the group consisting of an epoxy resin, an amino resin, an acrylic resin, a urethane resin, a phenol resin, an unsaturated polyester resin and an alkyd resin.

Item 8B. The battery packaging material according to any one of items 1B to 7B, wherein the curing accelerator is at least one selected from the group consisting of an amidine compound, a carbodiimide compound, a ketimine compound, a hydrazine compound, a sulfonium salt, a benzothiazolium salt and a tertiary amine compound.

Item 9B. The battery packaging material according to any one of items 1B to 8B, wherein the barrier layer is a metal foil.

Item 10B. The battery packaging material according to any one of items 1B to 9B, wherein the battery packaging material has a thickness of 40 to 120 μm as a whole.

Item 11B. A method for producing a battery packaging material, the method including a coating layer forming step of applying a resin composition, which contains a thermosetting resin and a curing accelerator, onto a barrier layer and heating and thereby curing the resin composition, wherein the coating layer forming step is carried out one or more times, and the resin composition containing reactive resin beads is used at least one time in the coating layer forming step, and before or after the coating layer forming step, a sealant layer is laminated on a surface of the barrier layer on a side opposite to a surface on which the coating layer is laminated.

Item 12B. A battery including a battery element including at least a positive electrode, a negative electrode and an electrolyte, the battery element being stored in the battery packaging material according to any one of items 1B to 10B.

Advantages of the Invention

A battery packaging material A according to the first aspect A of the present invention includes a laminated body including at least a coating layer, a barrier layer and a sealant layer in this order, and is not provided with an adhesive layer and a base material layer on the barrier layer unlike a conventional film-shaped battery packaging material. Therefore, the battery packaging material A can be made thin, and can contribute to downsizing and thinning of batteries.

In the battery packaging material A according to the first aspect A of the present invention, layers that form the coating layer provided on the barrier layer are formed of a cured product of a resin composition containing a thermosetting resin and a curing accelerator, and therefore in a step of curing the layers in the coating layer, the layers can be cured in a short time without necessity of aging under a high-temperature condition, so that the lead time can be reduced, and further, occurrence of product defects due to exposure to a high-temperature condition for a long period of time can be prevented.

In the battery packaging material A according to the first aspect A of the present invention, the coating layer provided on the barrier layer has two or more layers, and various functionalities can be imparted to the layers that form the coating layer. For example, when the elastic modulus of each of the layers that form the coating layer falls within a predetermined range, excellent moldability and chemical resistance can be imparted. When the outermost layer that forms of the coating layer contains a slipping agent, excellent slippage can be imparted.

In the battery packaging material A according to the first aspect A of the present invention, a plurality of layers having the same functionality or different functionalities can be laminated to form a coating layer, and therefore a battery packaging material having diverse functionalities can be easily provided.

In a conventional film-shaped battery packaging material, it is necessary to blend a pigment and/or dye in any one of an adhesive layer or a base material layer for imparting color tone-dependent discriminability for each battery type, and there is the disadvantage that the adhesive strength of the adhesive layer is reduced when a pigment and/or dye is blended in the adhesive layer, and the production cost of the base material layer is increased when a pigment and/or dye is blended in the base material layer. On the other hand, in the battery packaging material A according to the first aspect A of the present invention, discriminability can be imparted to the battery packaging material by including a pigment and/or dye in at least one layer that forms the coating layer, and therefore defects in impartment of discriminability to a conventional film-shaped battery packaging material can be eliminated. Further, when at least one layer that forms the coating layer contains a pigment and/or dye (particularly an inorganic pigment), the heat conductivity of the battery packaging material can be increased to improve the heat dissipation property, and therefore safety of batteries can be improved.

A battery packaging material B according to the second aspect B of the present invention includes a laminated body including at least a coating layer, a barrier layer and a sealant layer in this order, and is not provided with an adhesive layer and a base material layer on the barrier layer unlike a conventional film-shaped battery packaging material. Therefore, the battery packaging material A can be made thin, and can contribute to downsizing and thinning of batteries.

In the battery packaging material B according to the second aspect B of the present invention, reactive resin beads exist while being chemically bonded to a thermosetting resin in at least one layer that forms the coating layer provided on the barrier layer, so that excellent moldability can be imparted, and thus generation of cracks, pinholes and the like can be suppressed even when the molding depth during deep drawing molding is increased.

Further, in the battery packaging material B according to the second aspect B of the present invention, layers that form the coating layer provided on the barrier layer are formed of a cured product of a resin composition containing a thermosetting resin and a curing accelerator, and therefore in a step of curing the layers in the coating layer, the layers can be cured in a short time without necessity of aging under a high-temperature condition, so that the lead time can be reduced, and further, occurrence of product defects due to exposure to a high-temperature condition for a long period of time can be prevented.

In a conventional film-shaped battery packaging material, it is necessary to blend a pigment and/or dye in any one of an adhesive layer or a base material layer for imparting color tone-dependent discriminability for each battery type, and there is the disadvantage that the adhesive strength of the adhesive layer is reduced when a pigment and/or dye is blended in the adhesive layer, and the production cost of the base material layer is increased when a pigment and/or dye is blended in the base material layer. On the other hand, in the battery packaging material B according to the second aspect B of the present invention, discriminability can be imparted to the battery packaging material by including a pigment and/or dye in at least one layer that forms the coating layer, and therefore defects in impartment of discriminability to a conventional film-shaped battery packaging material can be eliminated. Further, when at least one layer that forms the coating layer contains a pigment and/or dye (particularly an inorganic pigment), the heat conductivity of the battery packaging material can be increased to improve the heat dissipation property, and therefore safety of batteries can be improved.

EMBODIMENTS OF THE INVENTION

A battery packaging material A according to the first aspect of the present invention includes a laminated body including at least a coating layer, a barrier layer and a sealant layer in this order, wherein the coating layer has a multilayer structure having two or more layers, and the layers that form the coating layer are each formed of a cured product of a resin composition containing a thermosetting resin and a curing accelerator.

A battery packaging material according to the second aspect B of the present invention includes a laminated body including at least a coating layer, a barrier layer and a sealant layer in this order, wherein the coating layer includes a single layer or multiple layers formed of a cured product of a resin composition containing a thermosetting resin and a curing accelerator, and the resin composition to be used for formation of at least one layer in the coating layer contains reactive resin beads.

Hereinafter, the battery packaging material A according to the first aspect A and the battery packaging material B according to the second aspect B of the present invention will be described in detail.

1. Laminated Structure of Battery Packaging Material

Figure 1:
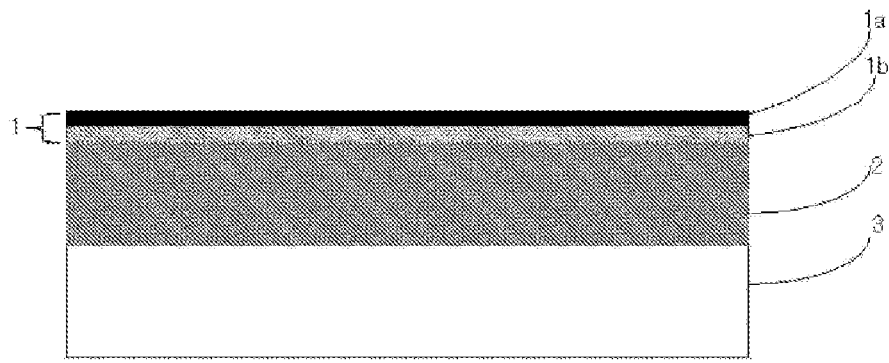
FIG. 1 is a drawing showing one example of a cross-sectional structure of a battery packaging material A according to the first aspect A of the present invention.
Figure 2:
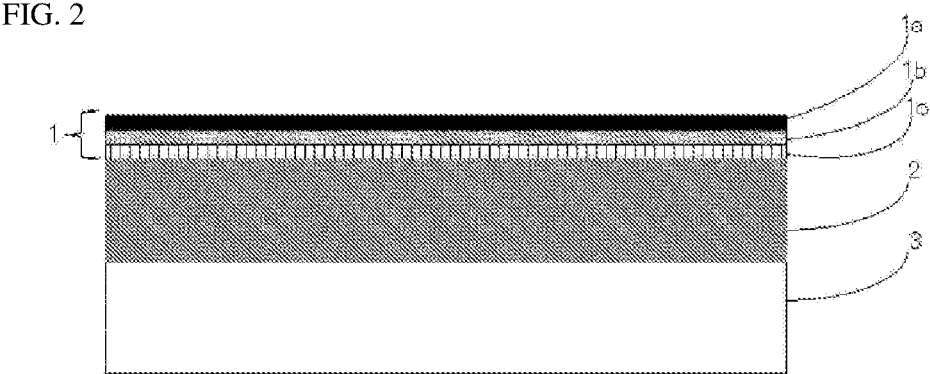
FIG. 2 is a drawing showing one example of a cross-sectional structure of the battery packaging material A according to the first aspect A of the present invention.

The battery packaging material A according to the first aspect A has a laminated structure which includes a laminated body including at least a coating layer 1, a barrier layer 2 and a sealant layer 3 in this order as shown in FIGS. 1 and 2.

In the battery packaging material A, the coating layer 1 has a multilayer structure having two or more layers. The number of layers that form the coating layer 1 may be appropriately determined according to functionalities to be imparted, and it is, for example, 2 to 8, preferably 2 to 5, further preferably 2 or 3. FIG. 1 shows a cross-sectional structure of the battery packaging material of the present invention in which the coating layer 1 has a two-layer structure (first coating layer 1a and second coating layer 1b), and FIG. 2 shows a cross-sectional structure of the battery packaging material of the present invention in which the coating layer 1 has a three-layer structure (first coating layer 1a, second coating layer 1b and third coating layer 1c).

In the battery packaging material A, the coating layer 1 is an outermost layer, and the sealant layer 3 is an innermost layer. That is, at the time of assembling a battery, the sealant layer 3 situated on the periphery of a battery element is heat-sealed with itself to hermetically seal the battery element, so that the battery element is encapsulated.

The battery packaging material A may have an adhesive layer 4 provided between the barrier layer 2 and the sealant layer 3 as necessary for the purpose of improving adhesion between the layers.

Figure 3:
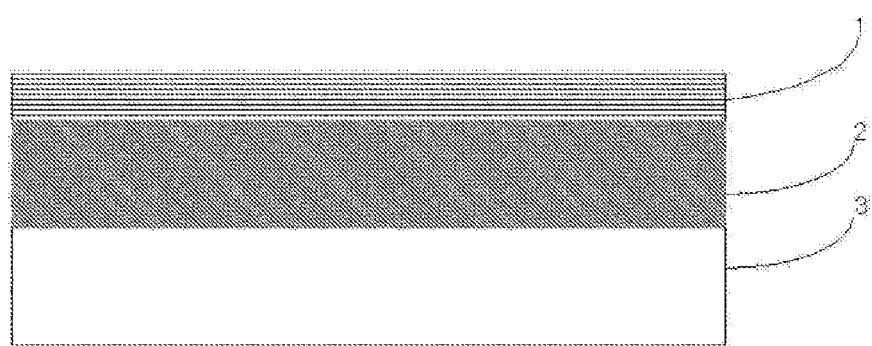
FIG. 3 is a drawing showing one example of a cross-sectional structure of a battery packaging material B according to the second aspect B of the present invention.

The battery packaging material B according to the second aspect B has a laminated structure which includes a laminated body including at least a coating layer 1, a barrier layer 2 and a sealant layer 3 in this order as shown in FIG. 3. In the battery packaging material B, the coating layer 1 may be a single-layer, or a multilayer having two or more layers.

Figure 4:
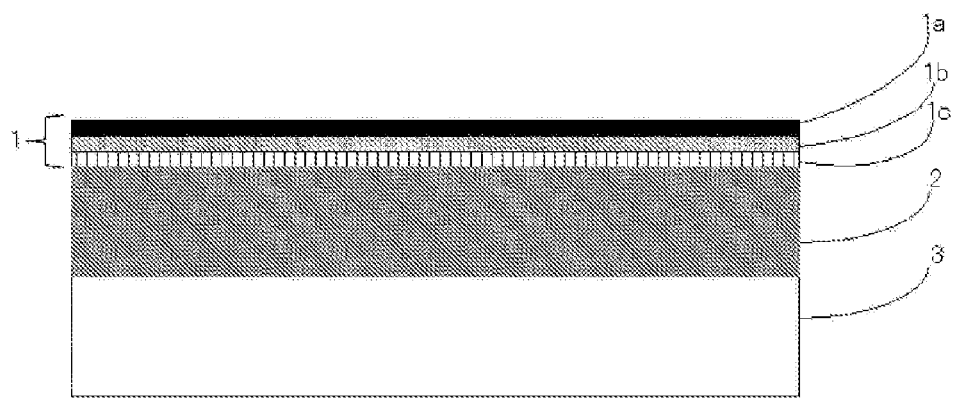
FIG. 4 is a drawing showing one example of a cross-sectional structure of a battery packaging material B according to the second aspect B of the present invention.

In the second aspect B, the coating layer 1 is preferably a multilayer having two or more layers, further preferably a multilayer having two or three layers, especially preferably a multilayer having three layers for the coating layer 1 to have a thickness which ensures that sufficient insulation quality can be imparted. FIG. 4 shows a laminated structure of the battery packaging material B in which the coating layer 1 has a three-layer structure having the first coating layer 1a, the second coating layer 1b and the third coating layer 1c in this order from the outermost surface toward the barrier layer 2 side.

In the battery packaging material B, the coating layer 1 is an outermost layer, and the sealant layer 3 is an innermost layer. That is, at the time of assembling a battery, the sealant layer 3 situated on the periphery of a battery element is heat-sealed with itself to hermetically seal the battery element, so that the battery element is encapsulated.

The battery packaging material B may have an adhesive layer 4 provided between the barrier layer 2 and the sealant layer 3 as necessary for the purpose of improving adhesion between the layers.

2. Compositions and Physical Properties of Layers That Form Battery Packaging Material

[Coating Layer 1]

In the battery packaging material A according to the first aspect A, the coating layer 1 is a layer that is provided on the barrier layer 2 and forms an outermost layer of the battery packaging material A. The coating layer 1 has a multilayer structure having two or more layers, and the layers that form the coating layer are each formed of a cured product of a resin composition containing a thermosetting resin and a curing accelerator. When the coating layer 1 has a laminated structure having two or more layers, and the layers that form the coating layer 1 are each formed of a cured product of a resin composition containing a thermosetting resin and a curing accelerator as described above, the layers can be cured in a short time. As a result, the lead time can be reduced, and further, occurrence of product defects due to exposure to a high-temperature condition for a long period of time can be prevented.

In the battery packaging material B according to the second aspect B, the coating layer 1 is a layer that is provided on the barrier layer 2 and forms an outermost layer of the battery packaging material. The coating layer 1 includes a single layer or multiple layers formed of a cured product of a resin composition containing a thermosetting resin and a curing accelerator, and the resin composition for forming at least one layer (cured product) that forms the coating layer contains reactive resin beads.

<Compositions of Layers That Form Coating Layer 1>

(Thermosetting Resin)

In the first aspect A, the resin composition to be used for formation of the layers that form the coating layer 1 contains a thermosetting resin. The thermosetting resin is not limited as long as it is polymerized when heated to form a high-molecular network structure, and cured. Specific examples of the thermosetting resin include epoxy resins, amino resins (melamine resins, benzoguanamine resins and the like), acrylic resins, urethane resins, phenol resins, unsaturated polyester resins and alkyd resins. Among these thermosetting resins, urethane resins and epoxy resins are preferred, and two-pack type curable urethane resins and two-pack type curable epoxy resins are further preferred, with two-pack type curable urethane resins being especially preferred for further reduction of the curing time, improvement of moldability and chemical resistance, and so on.

In the second aspect B, the resin composition to be used for formation of the coating layer 1 contains a thermosetting resin. The thermosetting resin is not limited as long as it is polymerized when heated to form a high-molecular network structure, and cured. The thermosetting resin to be used for formation of the coating layer 1 is not particularly limited, and specific examples thereof include epoxy resins, amino resins (melamine resins, benzoguanamine resins and the like), acrylic resins, urethane resins, phenol resins, unsaturated polyester resins and alkyd resins. These thermosetting resins may be used alone, or may be used in combination of two or more thereof. Among these thermosetting resins, urethane resins and epoxy resins are preferred, and two-pack type curable urethane resins and two-pack type curable epoxy resins are further preferred, with two-pack type curable urethane resins being especially preferred for further reduction of the curing time of the coating layer 1, further improvement of film strength and moldability, and so on.

In the first aspect A and the second aspect B, specific examples of the two-pack type curable urethane resin include combinations of a polyol compound (main agent) and an isocyanate-based compound (curing agent), and specific examples of the two-pack type curable epoxy resin include combinations of an epoxy resin (main agent) and an acid anhydride, an amine compound or an amino resin (curing agent).

The polyol compound to be used as a main agent in the two-pack type curable urethane resin in the first aspect A and the second aspect B is not particularly limited, and examples thereof include polyester polyols, polyester polyurethane polyols, polyether polyols and polyether polyurethane polyols. These polyol compounds may be used alone, or may be used in combination of two or more thereof.

The isocyanate-based compound to be used as a curing agent in the two-pack type curable urethane resin in the first aspect A and the second aspect B is not particularly limited, and examples thereof include polyisocyanates, adducts thereof, isocyanurate-modified products thereof, carbodiimide-modified products thereof, allophanate-modified products thereof, and biuret-modified products thereof. Specific examples of the polyisocyanate include aromatic diisocyanates such as diphenylmethane diisocyanate (MDI), polyphenylmethane diisocyanate (polymeric MDI), toluene diisocyanate (TDI), hexamethylene diisocyanate (HDI), bis(4-isocyanatecyclohexyl)methane (H12MDI), isophorone diisocyanate (IPDI), 1,5-naphthalene diisocyanate (1,5-NDI), 3,3'-dimethyl-4,4'-diphenylene diisocyanate (TODI) and xylene diisocyanate (XDI); aliphatic diisocyanates such as tramethylene diisocyanate, hexamethylene diisocyanate, trimethylhexamethylene diisocyanate and isophorone diisocyanate; cycloaliphatic diisocyanates such as 4,4'-methylene-bis(cyclohexylisocyanate) and isophorone diisocyanate; and polyaromatic diisocyanates such as 1,5-naphthalene diisocyanate (1,5-NDI). Specific examples of the adduct include those obtained by adding trimethylolpropane, glycol or the like to the polyisocyanate. These isocyanate-based compounds may be used alone, or may be used in combination of two or more thereof.

In the second aspect B, further excellent chemical resistance can be imparted when as a thermosetting resin, one having a polyaromatic backbone and/or a heterocyclic backbone is used in the coating layer 1 having a single-layer structure, or in the layer situated on the outermost side in the coating layer 1 having a multilayer structure. Specific examples of the thermosetting resin having a polyaromatic backbone include epoxy resins having a polyaromatic backbone, and urethane resins having a polyaromatic backbone. Examples of the thermosetting resin having a heterocyclic backbone include amino resins such as melamine resins and benzoguanamine resins. The thermosetting resin having a polyaromatic backbone and/or a heterocyclic backbone may be a one-pack type curable resin or a two-pack type curable resin.

In the first aspect A and the second aspect B, these thermosetting resins may be cross-linkable elastomers. The cross-linkable elastomer is a thermosetting resin capable of adding a soft segment to a cured product. For example, when the crosslinkable elastomer is a two-liquid curable urethane resin or a two-liquid curable epoxy resin, the above-mentioned main agent may have a structure which ensures that a soft segment can be added. The cross-linkable elastomer can be used as a part of the thermosetting resin to be used for formation of a layer that forms the coating layer 1 in order to impart a desired elastic modulus to the layer that forms the coating layer 1.

In the first aspect A and the second aspect B, these thermosetting resins may be used alone, or may be used in combination of two or more thereof in one layer that forms the coating layer 1. The thermosetting resins to be used in the layers that form the coating layer 1 may be the same or different, and the type of the thermosetting resin may be appropriately selected according to a function, physical property and the like to be imparted to each layer. For example, for a layer forming an outermost layer (outermost layer situated on a side opposite to the barrier layer) among the layers that form the coating layer 1, a thermosetting resin having a polyaromatic backbone and/or a heterocyclic backbone is suitably used for imparting excellent chemical resistance. Specific examples of the thermosetting resin having a polyaromatic backbone include epoxy resins having a polyaromatic backbone, and urethane resins having a polyaromatic backbone. Examples of the thermosetting resin having a heterocyclic backbone include amino resins such as melamine resins and benzoguanamine resins. The thermosetting resin having a polyaromatic backbone and/or a heterocyclic backbone may be a one-pack type curable resin or a two-pack type curable resin.

In the first aspect A and the second aspect B, more specific examples of the epoxy resin having a polyaromatic backbone include reaction products of dihydroxynaphthalene and epihalohydrin; reaction products of a condensate of naphthol and an aldehyde (naphthol novolac resin) and epihalohydrin; reaction products of a condensate of dihydroxynaphthalene and an aldehyde, and epihalohydrin; reaction products of a condensate of mono- or dihydroxynaphthalene and a xylylene glycol, and epihalohydrin; adducts of mono- or dihydroxynaphthalene and a diene compound, and epihalohydrin; and reaction products of a polynaphthol with naphthols coupled with each other, and epihalohydrin.

In the first aspect A and the second aspect B, more specific examples of the urethane resin having a polyaromatic backbone include reaction products of a polyol compound and an isocyanate-based compound having a polyaromatic backbone.

(Curing Accelerator)

In the first aspect A, the resin composition to be used for formation of the layers that form the coating layer 1 contains a curing accelerator. When a thermosetting resin and a curing accelerator coexist as described above, the layers that form the coating layer 1 are quickly cured without requiring aging under a high-temperature condition during production, so that the lead time can be reduced.

In the second aspect B, the resin composition to be used for formation of the coating layer 1 contains a curing accelerator. When a thermosetting resin and a curing accelerator coexist as described above, the coating layer 1 is quickly cured without requiring aging under a high-temperature condition during production, so that the lead time can be reduced.

Here, in the first aspect A and the second aspect B, the "curing accelerator" is a substance that does not form a crosslinked structure by itself, but accelerates a crosslinking reaction of a thermosetting resin, or a substance that acts to accelerate a crosslinking reaction of a thermosetting resin, and may form a crosslinked structure by itself.

In the first aspect A and the second aspect B, the type of the curing accelerator is appropriately selected according to a thermosetting resin to be used so that the above-mentioned hardness can be achieved, and examples thereof include amidine compounds, carbodiimide compounds, ketimine compounds, hydrazine compounds, sulfonium salts, benzothiazolium salts and tertiary amine compounds.

In the first aspect A and the second aspect B, the amidine compound is not particularly limited, and examples thereof include imidazole compounds, 1,8-diazabicyclo[5.4.0]undec-7-ene (DBU), 1,5-diazabicyclo[4.3.0]non-5-ene (DBN) and guanidine compounds. Specific examples of the imidazole compound include 2-methylimidazole, 2-ethylimidazole, 2-undecylimidazole, 2,4-dimethylimidazole, 2-heptadecylimidazole, 1,2-dimethylimidazole, 1,2-diethylimidazole, 2-ethyl-4-methylimidazole, 2-phenylimidazole, 1-benzyl-2-phenylimidazole, 1-cyanoethyl-2-methylimidazole, 1-cyanoethyl-2-undecylimidazole, 1-benzyl-2-methylimidazole, 2,4-diamino-6-[2'-methylimidazolyl-(1)']-ethyl-S-triazine, 2,4-diamino-6-[2'-ethyl-4'-methylimidazolyl-(1)']-ethyl-S-triazine, 2,4-diamino-6-[2'-undecylimidazolyl]-ethyl-S-triazine, 2,4-diamino-6-[T-methylimidazolyl-(1)']-ethyl-S-triazineisocyanuric acid adducts, 2-phenyl-4-methyl-5-hydroxymethylimidazole, 2-phenyl-4,5-dihydroxymethylimidazole and 2-aryl-4,5-diphenylimidazole. These amidine compounds may be used alone, or may be used in combination of two or more thereof.

In the first aspect A and the second aspect B, the carbodiimide compound is not particularly limited, and examples thereof include N,N'-dicyclohexylcarbodiimide, N,N'-diisopropylcarbodiimide, 1-ethyl-3-(3-dimethylaminopropyl) carbodiimide, N-[3-(dimethylamino)propyl]-N'-ethylcarbodiimide, N-[3-(dimethylamino)propyl]-N'-ethylcarbodiimide methiodide, N-tert-butyl-N'-ethylcarbodiimide, N-cyclohexyl-N'-(2-morpholinoethyl) carbodiimide meso-p-toluenesulfonate, N,N'-di-tert-butylcarbodiimide and N,N'-di-p-tolylcarbodiimide. These carbodiimide compounds may be used alone, or may be used in combination of two or more thereof.

In the first aspect A and the second aspect B, the ketimine compound is not particularly limited as long as it has a ketimine bond (N=C), and examples thereof include ketimine compounds obtained by reacting a ketone with an amine. Specific examples of the ketone include methyl ethyl ketone, methyl isopropyl ketone, methyl tertiary butyl ketone, methyl cyclohexyl ketone, diethyl ketone, ethyl propyl ketone, ethyl butyl ketone, dipropyl ketone, dibutyl ketone and diisobutyl ketone. Specific examples of the amine include aromatic polyamines such as o-phenylenediamine, m-phenylenediamine, p-phenylenediamine, m-xylylenediamine, diaminodiphenylmethane, diaminodiphenylsulfone and diaminodiethyldiphenylmethane; aliphatic polyamines such as ethylenediamine, propylenediamine, butylenediamine, diethylenetriamine, triethylenetetramine, tetraethylenepentamine, pentaethylenehexamine, hexamethylenediamine, trimethylhexamethylenediamine, 1,2-propanediamine, iminobispropylamine and methyliminobispropylamine; monoamines having an ether bond on the main chain and diamines having a polyether backbone, such as N-aminoethylpiperazine and 3-butoxyisopropylamine;

cycloaliphatic polyamines such as isophoronediamine, 1,3-bisaminomethylcyclohexane, 1-cyclohexylamino-3-aminopropane, and 3-aminomethyl-3,3,5-trimethylcyclohexylamine; diamines having a norbornane backbone; polyamideamines having an amino group at the molecular end of a polyamide; and 2,5-dimethyl-2,5-hexamethylenediamine, mencenediamine and 1,4-bis(2-amino-2-methylpropyl)piperazine. These ketimine compounds may be used alone, or may be used in combination of two or more thereof.

In the first aspect A and the second aspect B, the hydrazine compound is not particularly limited, and examples thereof include adipic acid dihydrazide and isophthalic acid dihydrazide. These hydrazine compounds may be used alone, or may be used in combination of two or more thereof.

In the first aspect A and the second aspect B, the sulfonium salt is not particularly limited, and examples thereof include alkylsulfonium salts such as 4-acetophenyldimethylsulfonium hexafluoroantimonate, 4-acetophenyldimethylsulfonium hexafluoroarsenate, dimethyl-4-(benzyloxycarbonyloxy)phenylsulfonium hexafluoroantimonate, dimethyl-4-(benzoyloxy)phenylsulfonium hexafluoroantimonate and dimethyl-4-(benzoyloxy)phenylsulfonium hexafluoroarsenate; benzylsulfonium salts such as benzyl-4-hydroxyphenylmethylsulfonium hexafluoroantimonate, 4-acetoxyphenylbenzylmethylsulfonium hexafluoroantimonate, benzyl-4-methoxyphenylmethylsulfonium hexafluoroantimonate, benzyl-3-chloro-4-hydroxyphenylmethylsulfonium hexafluoroarsenate and 4-methoxybenzyl-4-hydroxyphenylmethylsulfonium hexafluorophosphate; dibenzylsulfonium salts such as dibenzyl-4-hydroxyphenylsulfonium hexafluoroantimonate, dibenzyl-4-hydroxyphenylsulfonium hexafluorophosphate, dibenzyl-4-methoxyphenylsulfonium hexafluoroantimonate and benzyl-4-methoxybenzyl-4-hydroxyphenylsulfonium hexafluorophosphate; and substituted benzylsulfonium salts such as p-chlorobenzyl-4-hydroxyphenylmethylsulfonium hexafluoroantimonate, p-nitrobenzyl-4-hydroxyphenylmethylsulfonium hexafluoroantimonate, 3,5-dichlorobenzyl-4-hydroxyphenylmethylsulfonium hexafluoroantimonate and o-chlorobenzyl-3-chloro-4-hydroxyphenylmethylsulfonium hexafluoroantimonate. These sulfonium salts may be used alone, or may be used in combination of two or more thereof.

In the first aspect A and the second aspect B, the benzothiazolium salt is not particularly limited, and examples thereof include benzylbenzothiazolium salts such as 3-benzylbenzothiazolium hexafluoroantimonate, 3-benzylbenzothiazolium hexafluorophosphate, 3-benzylbenzothiazolium tetrafluoroborate, 3-(p-methoxybenzyl)benzothiazolium hexafluoroantimonate, 3-benzyl-2-methylthiobenzothiazolium hexafluoroantimonate and 3-benzyl-5-chlorobenzothiazolium hexafluoroantimonate. These benzothiazolium salts may be used alone, or may be used in combination of two or more thereof.

In the first aspect A and the second aspect B, the tertiary amine compound is not particularly limited, and examples thereof include aliphatic tertiary amines such as trimethylamine, triethylamine, tripropylamine, tributylamine, triethylenediamine, 1,4-diazabicyclo[2.2.2]octane, quinuclidine and 3-quinuclidinol; aromatic tertiary amines such as dimethylaniline; and heterocyclic tertiary amines such as isoquinoline, pyridine, collidine and beta-picoline. These tertiary amine compounds may be used alone, or may be used in combination of two or more thereof.

In the first aspect A and the second aspect B, one preferred example of the curing accelerator is one that serves as a thermal acid generator. The thermal acid generator is a substance that serves as a curing accelerator by generating an acid when it is heated. Specific examples of those that can serve as a thermal acid generator among the above-mentioned curing accelerators include sulfonium salts and benzothiazolium salts.

In the first aspect A and the second aspect B, another preferred example of the curing accelerator is thermally potential one that is activated under a predetermined heating condition (e.g. 80 to 200° C., preferably 100 to 160° C.) to accelerate a crosslinking reaction of a thermosetting resin. Specific examples of thermally potential substances among the above-mentioned curing accelerators include epoxy adducts including an epoxy compound added to an amidine compound, a hydrazine compound, a tertiary amine compound or the like.

Further, in the first aspect A and the second aspect B, another preferred example of the curing accelerator is hydrolytically potential one that does not serve as a curing agent in a hermetically sealed state, i.e. a moisture shut-off state, but is hydrolyzed to serve as a curing agent under moisture-existing conditions obtained by opening the hermetically sealed state. Specific examples of hydrolytically potential substances among the above-mentioned curing accelerators include epoxy adducts including an epoxy compound added to an amidine compound, a hydrazine compound, a tertiary amine compound or the like.

In the first aspect A and the second aspect B, these curing accelerators may be used alone, or may be used in combination of two or more thereof. Among these curing accelerators, amidine compounds and sulfonium salts are preferred, with amidine compounds being further preferred.

In the first aspect A and the second aspect B, these curing accelerators may be used alone, or may be used in combination of two or more thereof in one layer that forms the coating layer 1. The curing accelerators to be used in the layers that form the coating layer 1 may be the same or different, and the type of the curing accelerator may be appropriately selected according to a function, physical property and the like to be imparted to each layer.

In the first aspect A and the second aspect B, the content of the curing accelerator in the resin composition to be used for formation of the coating layer 1 is appropriately determined according to, for example, the type of thermosetting resin and the type of curing accelerator to be used, and for example, the content of the curing accelerator in terms of the total amount is 0.01 to 6 parts by mass, preferably 0.05 to 5 parts by mass, further preferably 0.1 to 2 parts by mass based on 100 parts by mass of the thermosetting resin.

(Pigment and/or Dye)

At least one layer that forms the coating layer 1 may contain a pigment and/or dye as necessary. When at least one layer that forms the coating layer 1 contains a pigment and/or dye, discriminability can be imparted to the battery packaging material (the battery packaging material can be colored by a pigment and/or dye), and the heat conductivity can be increased to improve the heat dissipation property. As the pigment and/or dye, those shown below can be equally used in the first aspect A and the second aspect B.

The material of the pigment is not particularly limited, and the pigment may be either an inorganic pigment or an organic pigment. Specific examples of the inorganic pigment include carbon black, carbon nanotube, graphite, talc, silica, kaolin, montmorilloide, montmorillonite, synthetic mica, hydrotalcite, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, gold, aluminum, copper and nickel. Specific examples of the organic pigment include azo pigments, polycyclic pigments, lake pigments and fluorescent pigments. These pigments may be used alone, or may be used in combination of two or more thereof.

The shape of the pigment is not particularly limited, and examples thereof include a spherical shape, a fibrous shape, a plate shape, an amorphous shape and a balloon shape. The average particle size of the pigment is not particularly limited, and it is, for example, 0.01 to 3 µm, preferably 0.05 to 1 µm. The average particle size of the pigment is a value measured using Shimadzu Laser Diffraction-Type Particle-Size-Distribution Measuring Apparatus SALD-2100-WJA1 by a cyclone injection type dry measurement method in which a powder to be measured is injected from a nozzle by means of compressed air, dispersed in the air, and measured.

The surface of the pigment may be subjected to various kinds of surface treatments such as an insulation treatment and dispersibility enhancing treatment (resin coating treatment) as necessary.

The type of the dye is not particularly limited as long as it can be dissolved/dispersed in a resin composition to be used for formation of the coating layer 1, and examples thereof include nitro dyes, azo-based dyes, stilbene dyes, carbonium dyes, quinoline dyes, methine dyes, thiazole dyes, quineimine dyes, anthraquinone dyes, indigoid dyes and phthalocyanine dyes. Azo dyes, carbonium dyes, anthraquinone dyes and so on are preferred. These dyes may be used alone, or may be used in combination of two or more thereof.

Among these pigments and dyes, pigments are preferred, inorganic pigments are more preferred, carbon materials such as carbon black, carbon nanotube and graphite are further preferred, and carbon black is especially preferred for further improving the heat dissipation property of the battery packaging material.

When the coating layer 1 has a multilayer structure having two or more layers, and contains the pigment, the pigment and/or dye may be contained in any one of these two or more layers, or contained in two or more layers. For reducing a difference in color tone between a molded part and a non-molded part after molding the battery packaging material, it is preferred that the coating layer 1 has a multilayer structure having two or more layers, and the pigment and/or dye is contained in two or more layers, and it is further preferred that the coating layer 1 has a multilayer structure having three layers, and the pigment and/or dye is contained in all of the three layers.

When the pigment and/or dye is contained in at least one layer that forms the coating layer 1, the content thereof may be appropriately determined according to the type of pigment and/or dye to be used, discriminability and dissipation property to be imparted to the battery packaging material, and for example, the content of the pigment and/or dye in terms of the total amount is 1 to 30 parts by mass based on 100 parts by mass of the thermosetting resin contained in the layer which contains the pigment and/or dye. For imparting further excellent discriminability, the content of the pigment and/or dye in terms of the total amount is 3 to 20 parts by mass based on 100 parts by mass of the thermosetting resin contained in the layer which contains the pigment and/or dye. For imparting further excellent discriminability and suppressing deterioration of moldability which is caused by the pigment and/or dye, the content of the pigment and/or dye in terms of the total amount is 5 to 15 parts by mass based on 100 parts by mass of the thermosetting resin contained in the layer which contains the pigment and/or dye.

(Reactive Resin Beads)

In the second aspect B, the resin composition to be used for formation of the coating layer 1 having a single-layer structure or at least one layer that forms the coating layer 1 having a multilayer structure contains reactive resin beads together with the above-mentioned thermosetting resin and curing accelerator. When at least one layer that forms the coating layer 1 contains reactive resin beads as described above, the reactive resin beads are chemically bonded to the thermosetting resin in the layer, so that excellent moldability can be imparted to the battery packaging material B.

The reactive resin beads are resinous particles (filler) having a functional group that is reacted with and chemically bonded to the thermosetting resin.

The type of functional group of the reactive resin beads to be used in the second aspect B is appropriately determined according to the type of the thermosetting resin, and examples thereof include a hydroxyl group, a carboxyl group, an isocyanate group, a mercapto group, a hydrolyzable silyl group, an epoxy group, a polymerizable vinyl group and a (meth)acryloyl group. The number of functional groups per one reactive resin bead is not particularly limited, but it is preferred that one reactive resin bead has two or more functional groups for ensuring that reactive resin beads are stably retained in the adhesive layer to exhibit excellent moldability. More specifically, in the case of reactive resin beads having hydroxyl groups, the hydroxyl value is, for example, 1 to 100 KOH mg/g, preferably 5 to 80 KOH mg/g. In the case of reactive resin beads having isocyanate groups (—N=C=O), the N=C=O content is 1 to 10% by weight, preferably 3 to 8% by weight. In the case of reactive resin beads having functional groups other than the hydroxyl value and isocyanate groups, the functional group equivalent (a value obtained by dividing the molecular weight of the reactive resin beads by the molecular weight of the functional group) is 100 to 5000, preferably 150 to 3000.

The resin that forms particles of reactive resin beads is not particularly limited, and examples thereof include urethane resins, acrylic resins, urethane acrylic resins and nylon resins. Among them, urethane resins and acrylic resins are preferred.

As reactive resin beads according to the second aspect B, urethane beads having hydroxyl groups and/or isocyanate groups as functional groups, and acrylic beads having hydroxyl groups and/or isocyanate groups as functional groups are preferred for further improving moldability.

The refractive index of the reactive resin beads is not particularly limited, but it is, for example, 1.3 to 1.8, preferably 1.4 to 1.6 for imparting excellent transparency to the coating layer 1. Here, the refractive index of the reactive resin beads is a value that is measured in accordance with the method B in JIS K7142 "Plastics: Determination of refractive index". As the refractive index of the reactive resin beads is closer to that of the thermosetting resin to be used, it becomes harder to visually recognize the existence of reactive resin beads in the coating layer 1, so that further excellent transparency can be imparted to the coating layer 1.

The average particle size of reactive resin beads is not particularly limited, but it is, for example, 0.1 to 15 µm, preferably 0.2 to 10 µm for further improving film strength and moldability. The average particle size of reactive resin beads is a value measured using Shimadzu Laser Diffraction-Type Particle-Size-Distribution Measuring Apparatus SALD-2100-WJA1 by a cyclone injection type dry measurement method in which a powder to be measured is injected from a nozzle by means of compressed air, dispersed in the air, and measured.

As these reactive resin beads, for example, Art-pearl C-TH series (hydroxyl group-added urethane beads) and Art-pearl RU to RV series (reactive urethane beads-Block NCO type) (all of which are manufactured by Negami Chemical Industrial Co., Ltd) are commercially available, and these commercial products can also be used.

These kinds of reactive resin beads may be used alone, or may be used in combination of two or more thereof.

The content of the reactive resin beads in the resin composition to be used for formation of at least one layer that forms the coating layer 1 is appropriately determined according to, for example, the type of thermosetting resin and the type of reactive resin beads to be used, and for example, the content of the reactive resin beads in terms of the total amount is 0.1 to 30 parts by mass, preferably 0.2 to 15 parts by mass based on 100 parts by mass of the thermosetting resin.

(Other Additives)

In the first aspect A, the resin composition to be used for formation of the layers that form the coating layer 1 may contain, in addition to the above-mentioned components, other additives such an organic filler, a slipping agent, a solvent and an elastomer resin as necessary according to functionalities etc. to be imparted to the layers.

In the second aspect B, the resin composition to be used for formation of the coating layer 1 may contain other additives such an organic filler, a slipping agent, a solvent and an elastomer resin as necessary in addition to the above-mentioned components. Particularly, when the coating layer 1 having a single-layer structure, or a layer situated on the outermost side in the coating layer 1 having a multilayer structure contains a slipping agent, moldability/processability in press molding and embossing can be improved, and operability can be improved.

In the first aspect A and the second aspect B, when a layer forming an outermost layer (outermost layer situated on a side opposite to the barrier layer) among the layers that form the coating layer 1 contains an organic filler and a slipping agent, a slipping effect can be imparted to the surface of the battery packaging material of the present invention, moldability/processability in press molding and embossing can be improved, and operability can be improved.

In the first aspect A and the second aspect B, the type of the organic filler is not particularly limited, and examples thereof include high-melting-point nylon, crosslinked acryl, crosslinked styrene, crosslinked polyethylene and benzoguanamine. The shape of the organic filler is not particularly limited, and examples thereof include a spherical shape, a fibrous shape, a plate shape, an amorphous shape and a balloon shape.

In the first aspect A and the second aspect B, the slipping agent is not particularly limited, and it may be a nonreactive slipping agent, or a reactive slipping agent. Particularly, the reactive slipping agent has the advantage that the slipping agent is hard to be bled and lost from the outermost layer that forms the coating layer 1, so that occurrence of powdering or offset at the time of use, and deterioration of the slipping effect with time can be suppressed, and therefore among slipping agents, a reactive slipping agent is preferred.

Here, in the first aspect A and the second aspect B, the nonreactive slipping agent is a compound that does not have a functional group which reacts with and chemically bonds to the thermosetting resin and which can impart slippage (slipping performance). The reactive slipping agent is a compound that has a functional group which reacts with and chemically bonds to the thermosetting resin and which can impart slippage (slipping performance).

In the first aspect A and the second aspect B, the nonreactive slipping agent is not particularly limited, and specific examples thereof include fatty acid amides, metal soaps, hydrophilic silicones, acrylics grafted with silicone, epoxies grafted with silicone, polyethers grafted with silicone, polyesters grafted with silicone, block silicone acrylic copolymers, polyglycerol-modified silicones and paraffins. These nonreactive slipping agents may be used alone, or may be used in combination of two or more thereof.

In the first aspect A and the second aspect B, the type of functional group in the reactive slipping agent is appropriately determined according to the type of thermosetting resin to be used, and examples thereof include a hydroxyl group, a mercapto group, a hydrolyzable silyl group, an isocyanate group, an epoxy group, a polymerizable vinyl group and a (meth)acryloyl group. The number of functional groups per molecule in the reactive slipping agent is not particularly limited, and for example, it is 1 to 3, preferably 1 or 2.

In the first aspect A and the second aspect B, specific examples of the reactive slipping agent include modified silicones having the above-mentioned functional group; modified fluororesins having the above-mentioned functional group; compounds in which the above-mentioned functional group is introduced into a fatty acid amide such as stearic acid amide, oleic acid amide, erucic acid amide or ethylene-bis-stearic acid amide; metal soaps including the above-mentioned functional group introduced therein; and paraffins including the above-mentioned functional group introduced therein. These reactive slipping agents may be used alone, or may be used in combination of two or more thereof. Among these reactive slipping agents, modified silicones having the above-mentioned functional group, fluororesins having the above-mentioned functional group, and silicone-modified resins having the above-mentioned functional group are preferred. Specific examples of the modified silicone include modified silicones in which a polymer having the above-mentioned functional group is block-polymerized, such as modified silicones in which an acrylic resin is block-polymerized; and modified silicones in which a monomer having the above-mentioned functional group is graft-polymerized, such as modified silicones in which an acrylate is graft-polymerized. Specific examples of the modified fluororesin include modified fluororesins in which a monomer having the above-mentioned functional group is graft-polymerized, such as fluororesins in which an acrylate is graft-polymerized; and fluororesins in which a polymer having the above-mentioned functional group is block-polymerized, such as modified fluororesins in which an acrylic resin is block-polymerized. Specific examples of the silicone-modified resin include silicone-modified resins which have the above-mentioned functional group and in which silicone is graft-polymerized, such as silicone-modified acrylic resins in which silicone is graft-polymerized with an acrylic resin having the above-mentioned functional group. Specific examples of the modified fluororesin include modified fluororesins in which a monomer having the above-mentioned functional group is graft-polymerized, such as fluororesins in which an acrylate is graft-polymerized; and fluororesins in which a polymer having the above-mentioned functional group is block-polymerized, such as modified fluororesins in which an acrylic resin is block-polymerized. Examples of the especially preferred reactive slipping agent among those described above include modified silicones in which a monomer or polymer having the above-mentioned functional group is polymerized with one end of silicone; and modified fluororesins in which a monomer or polymer having the above-mentioned functional group is polymerized with one end of a fluororesin. As these modified silicones and modified fluororesins, for example, "MODIPER (registered trademark) F and FS Series" (manufactured by NOF CORPORATION), "SYMAC (registered trademark) Series" (TOAGOSEI CO., LTD.), and so on are commercially available, and these commercial products can also be used.

In the first aspect A and the second aspect B, when the resin composition to be used for formation of a layer forming an outermost layer in the coating layer 1 contains a slipping agent, the content of the slipping agent is not particularly limited, and for example, the content of the slipping agent in terms of the total amount is 1 to 12 parts by mass, preferably 3 to 10 parts by mass, further preferably 5 to 8 parts by mass based on 100 parts by mass of the thermosetting resin. These slipping agents may be used alone, or may be used in combination of two or more thereof.

In the second aspect B, when the coating layer 1 having a single-layer structure, or a layer situated on the outermost side in the coating layer 1 having a multilayer structure contains a slipping agent, the content of the slipping agent is not particularly limited, and for example, the content of the slipping agent in terms of the total amount is 1 to 12 parts by mass, preferably 3 to 10 parts by mass, further preferably 5 to 8 parts by mass based on 100 parts by mass of the thermosetting resin.

In the second aspect B, when a layer other than the layer situated on the outermost surface (i.e. a layer provided between the outermost layer that forms the coating layer 1 and the barrier 2) in the coating layer 1 having a multilayer structure contains an elastomer resin, moderate flexibility is imparted to the coating layer 1 while shrinkage of the coating layer 1 during curing is suppressed, so that excellent moldability can be further improved.

In the second aspect B, the elastomer resin may be one that has a functional group crosslinkable with the thermosetting resin, and is crosslinked with the thermosetting resin when cured, or may be one that does not have such a functional group, and is not crosslinked with the thermosetting resin even when cured. The type of elastomer resin is not particularly limited, and examples thereof include polyolefin-based elastomers such as ethylene-based elastomers containing, as constituent monomers, ethylene and one or more α-olefins having 2 to 20 carbon atoms (excluding ethylene); styrene-based elastomers; polyester-based elastomers; urethane-based elastomers; acrylic elastomers; epoxy-based elastomers such as bisphenol A-type epoxy-based elastomers; polyol-based elastomers such as those of polyester polyols, polyester polyurethane polyols, polyether polyols and polyether polyurethane polyols; and rubber components such as nitrile rubber, fluororubber, acrylic rubber, silicone rubber, chloroprene rubber, isoprene rubber and butadiene rubber. Among these elastomer resins, urethane-based elastomers, epoxy-based elastomers and polyol-based elastomers are preferred. These elastomer resins may be used alone, or may be used in combination of two or more thereof.

In the second aspect B, when a layer other than the layer situated on the outermost surface (i.e. a layer provided between the outermost layer that forms the coating layer 1 and the barrier 2) in the coating layer 1 having a multilayer structure contains an elastomer resin, the content of the elastomer resin is not particularly limited, and for example, the content of the slipping agent in terms of the total amount is 3 to 50 parts by mass, preferably 5 to 30 parts by mass, further preferably 10 to 20 parts by mass based on 100 parts by mass of the thermosetting resin.

<Physical Properties of Layers that Form the Coating Layer 1 in First Aspect A>

In the first aspect A, the physical properties of the layers that form the coating layer 1 are not particularly limited, and may be appropriately determined according to functionalities to be imparted, but it is preferred that all the layers that form the coating layer have an elastic modulus of 1500 to 6000 MPa for imparting excellent moldability to the battery packaging material of the present invention. It is further preferred that all the layers that form the coating layer have an elastic modulus of 2000 to 5500 MPa for further improving moldability.

In the first aspect A, it is preferred that at least one of the layers that form the coating layer 1 has an elastic modulus of 2500 to 6000 MPa (hereinafter, sometimes referred to as a "high-elastic-modulus layer"). When the layers that form the coating layer 1 include at least one such high-elastic-modulus layer, excellent resistance to chemicals such as an electrolytic solution, an acid, an alkali and an organic solvent can be imparted. The elastic modulus of the high-elastic-modulus layer is further preferably 3000 to 6000 MPa for imparting further excellent chemical resistance. It suffices that at least one of the layers that form the coating layer 1 is the high-elastic-modulus layer from the viewpoint of chemical resistance, but two or more layers or all the layers that form the coating layer 1 may be high-elastic-modulus layers. The location at which the high-elastic-modulus layer is disposed in the coating layer 1 is not particularly limited, and the high-elastic-modulus layer may be any of an outermost layer (outermost layer situated on a side opposite to the barrier layer), a layer that is in contact with the barrier layer, and a layer situated between the outermost layer and the layer that is in contact with the barrier layer when the coating layer 1 has a multilayer structure having three or more layers, but the high-elastic-modulus layer is preferably the outermost layer for effectively imparting chemical resistance.

In the battery packaging material A according to the first aspect A, preferred examples of the configuration of the coating layer 1 for imparting excellent moldability and chemical resistance are as follows. When the coating layer 1 has a two-layer structure, the elastic modulus of the layer that is in contact with the barrier layer is 1500 to 6000 MPa, preferably 2000 to 3500 MPa; and the elastic modulus of the outermost layer is 3000 to 6000 MPMpa, preferably 3000 to 5500 MPa. When the coating layer 1 has a three-layer structure, the elastic modulus of the layer that is in contact with the barrier layer is 1500 to 6000 MPa, preferably 2000 to 3500 MPa; the layer between the outermost layer and the layer that is in contact with the barrier layer is 1500 to 6000 MPa, preferably 2200 to 4500 MPa; and the elastic modulus of the outermost layer is 3000 to 6000 MPa, preferably 3000 to 5500 MPa, further preferably 3000 to 5500.

In the first aspect A, the elastic modulus of each layer that forms the coating layer 1 can be set in the above-described range by appropriately adjusting the type of a thermosetting resin to be used for formation of each layer, the type and amount of a curing agent, and so on. Specifically, the elastic modulus of each layer can be set to a desired elastic modulus by appropriately adjusting the amount and type of a crosslinkable elastomer in a thermosetting resin to be used for formation of each layer.

In this specification, the elastic modulus is a value measured by a nanoindentation method, and specifically, the elastic modulus is determined by using a load-indentation depth curve obtained by pressing an indenter made of diamond tip having a tip in the form of a regular-triangular pyramid (Berkovich type) into a measurement object layer using a nanoindenter, and continuously measuring indentation depths under loading and unloading conditions.

<Thickness of Coating Layer 1 in First Aspect A>

The thickness of each layer that forms the coating layer 1 in the first aspect A is, for example, 1 to 5 µm, preferably 2 to 4 µm.

The thickness of the whole of the coating layer 1 in the first aspect A varies depending on the number of layers that form the coating layer 1, and cannot be uniformly defined, but it is normally 2 to 25 µm, preferably 4 to 20 µm.

(Preferred Layer Structure of Coating Layer 1 in Second Aspect B)

As described above, the coating layer 1 in the second aspect B may have a single-layer structure, or a multilayer structure having two or more layers, but for the coating layer 1 to have a thickness which ensures that sufficient insulation quality can be imparted, the coating layer 1 has preferably a multilayer structure having two or more layers, further preferably a multilayer structure having two or three layers, especially preferably a multilayer structure having three layers.

When the coating layer 1 in the second aspect B has a multilayer structure having two layers, the reactive resin beads may be contained in any one of these layers, or contained both these layers, but it is preferred that the reactive resin beads are contained in only a layer situated on the outermost surface. That is, when the coating layer 1 has a two-layer structure in which the first coating layer 1a and the second coating layer 1b are arranged in this order from the outermost surface side toward the barrier layer 2, it is preferred that the first coating layer 1a contains the reactive resin beads, and the second coating layer 1b does not contain the reactive resin beads for improving adhesion between the coating layer 1 and the barrier layer 2. When the coating layer 1 having a two-layer structure as described above contains a pigment and/or dye, the pigment and/or dye may be contained in at least any one of the first coating layer 1a and the second coating layer 1b. For reducing a difference in color tone between a molded part and a non-molded part after molding the battery packaging material, it is preferred that the pigment and/or dye is contained in both the first coating layer 1a and the second coating layer 1b.

When the coating layer 1 in the second aspect B is a multilayer having three layers, the reactive resin beads may be contained in any one of these layers, or contained in two or more of these layers, but it is preferred that the reactive resin beads are contained in only a layer arranged in the middle among the layers. That is, when the coating layer 1 has a three-layer structure in which the first coating layer 1a, the second coating layer 1b and the third coating layer 1c are arranged in this order from the outermost surface side toward the barrier layer 2, it is preferred that the second coating layer 1b contains the reactive resin beads, and either the first coating layer 1b or the third coating layer 1c does not contain the reactive resin beads for more effectively imparting chemical resistance and slippage while improving adhesion between the coating layer 1 and the barrier layer 2. When the coating layer 1 having a three-layer structure as described above contains a pigment, the pigment and/or dye may be contained in at least any one of the first coating layer 1a, the second coating layer 1b and the third coating layer 1c. For reducing a difference in color tone between a molded part and a non-molded part after molding the battery packaging material, it is preferred that the pigment and/or dye is contained in at least two of the first coating layer 1a, the second coating layer 1b and the third coating layer 1c, and it is further preferred that the pigment and/or dye is contained in all these three layers.

(Thickness of Coating Layer 1 in Second Aspect B)

The thickness of the whole of the coating layer 1 in the second aspect B is not particularly limited, but it is, for example, 4 to 20 µm, preferably 6 to 18 µm. More specifically, when the coating layer 1 has a single-layer structure, the thickness thereof is, for example, 2 to 10 µm, preferably 3 to 7 µm. When the coating layer 1 has a multilayer structure having two or more layers, the thickness of each layer alone is, for example, 1 to 5 µm, preferably 2 to 4 µm.

[Barrier Layer 2]

In each of the battery packaging material according to the first aspect A and the second aspect B of the present invention, the barrier layer 2 is a layer which is intended to improve the strength of the packaging material, and also functions as a barrier layer for preventing ingress of water vapor, oxygen, light and the like into the battery. Specific examples of the material of the barrier layer 2 include metal foils such as those of aluminum, stainless steel and titanium; and films on which an inorganic compound such as silicon oxide or alumina is vapor-deposited. Among them, metal foils are preferred, and aluminum foils are further preferred. For preventing occurrence of creases and pinholes during production of the battery packaging material, it is preferred to use a soft aluminum foil, for example an annealed aluminum foil (JIS A8021P-O) or (JIS A8079P-O), for the barrier layer 2 in the present invention.

The thickness of the barrier layer 2 is not particularly limited, but for example, it is normally 10 to 200 µm, preferably 20 to 100 µm when a metal foil is used.

When a metal foil is to be used as the barrier layer 2, it is preferred that at least one surface, preferably at least a surface on the sealant layer side, further preferably both surfaces are subjected to a chemical conversion treatment for stabilization of bonding, prevention of dissolution and corrosion, and so on. Here, the chemical conversion treatment is a treatment for forming an acid resistant film on the surface of the barrier layer 2. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer formed of repeating units represented by the following general formulae (1) to (4).

[Chemical Formula 1]

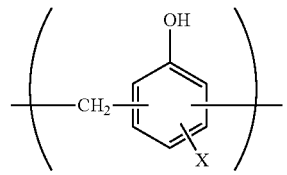

(1)

-continued

[Chemical Formula 2]

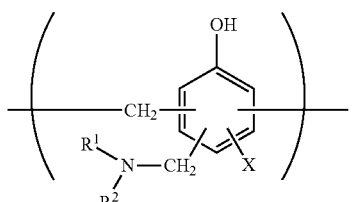

(2)

[Chemical Formula 3]

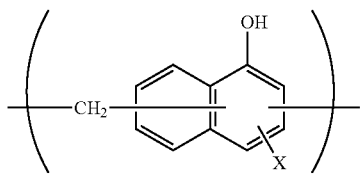

(3)

[Chemical Formula 4]

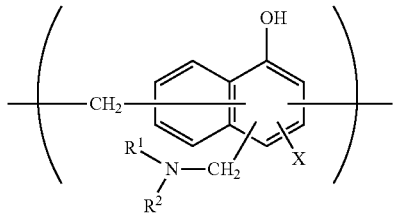

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups having 1 to 4 carbon atoms, such as a methyl group, an ethyl group, an n-propyl group, an isopropyl group, an n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 to about 1000000, preferably about 1000 to about 20000.

Examples of the chemical conversion treatment method for imparting corrosion resistance to the metal foil include a method in which the metal foil is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal foil. A resin layer with a cationic polymer crosslinked with a crosslinking agent may be formed on the corrosion resistance treatment layer. Here, examples of the cationic polymer include polyethyleneimine, ion polymer complexes composed of a polymer having polyethyleneimine and a carboxylic acid, primary amine-grafted acrylic resins obtained by grafting primary amine to an acryl backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

These chemical conversion treatments may be performed alone, or may be performed in combination of two or more thereof. The chemical conversion treatments may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistant film to be formed on the surface of the metal foil in the chemical conversion treatment is not particularly limited, but for example, when a chromate treatment is performed using a chromic acid compound, a phosphoric acid compound and the aminated phenol polymer in combination, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to about 200 mg, preferably about 5.0 mg to 150 mg, per 1 $m^2$ of the surface of the metal foil.

The chemical conversion treatment is performed in the following manner: a solution containing a compound to be used for formation of an acid resistant film is applied to the surface of the metal foil by a bar coating method, a roll coating method, a gravure coating method, an immersion method or the like, and heating is then performed so that the temperature of the metal foil reaches about 70 to 200° C. The metal foil may be subjected to a degreasing treatment by an alkali immersion method, an electrolytic cleaning method, an acid cleaning method, an electrolytic acid cleaning method or the like before the barrier layer 2 is subjected to a chemical conversion treatment. When a degreasing treatment is performed as described above, the chemical conversion treatment of the surface of the metal foil can be further efficiently performed.

[Sealant Layer 3]

In the battery packaging material according to the first aspect A and the second aspect B of the present invention, the sealant layer 3 corresponds to an innermost layer, and at the time of assembling a battery, the sealant layers are heat-sealed with each other to hermetically seal the battery element.

The resin component to be used in the sealant layer 3 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylenes such as low-density polyethylene, medium-density polyethylene, high-density polyethylene and linear low-density polyethylene; crystalline or noncrystalline polypropylenes such as homopolypropylene, block copolymers of polypropylenes (e.g. block copolymers of propylene and ethylene) and random copolymers of polypropylenes (e.g. random copolymers of propylene and ethylene); terpolymers of ethylene-butene-propylene; and the like. Among these polyolefins, polyethylenes and polypropylenes are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer obtained by modifying the polyolefin with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, crystalline or noncrystalline polyolefins, cyclic polyolefins, and blend polymers thereof are preferred, and polyethylenes, polypropylenes, copolymers of ethylene and norbornene, and blend polymers of two or more thereof are further preferred.

The sealant layer 3 may be formed from one resin component alone, or may be formed from a blend polymer obtained by combining two or more resin components. Further, the sealant layer may be formed of only one layer, or may be formed of two or more layers with the same resin component or different resin components.

The thickness of the sealant layer 3 is not particularly limited, but it is 2 to 2000 μm, preferably 5 to 1000 μm, further preferably 10 to 500 μm.

[Adhesive Layer 4]

In the battery packaging material according to the first aspect A and the second aspect B of the present invention, the adhesive layer 4 is a layer that is provided between the barrier layer 2 and the sealant layer 3 as necessary for strongly bonding the barrier layer 2 and the sealant layer 3 to each other.

The adhesive layer 4 according to the first aspect A and the second aspect B is formed from a bonding resin composition capable of bonding the barrier layer 2 and the sealant layer 3 to each other. The adhesive component to be used for formation of the adhesive layer 4 is not particularly limited as long as it is capable of bonding the barrier layer 2 and the sealant layer 3 to each other, and it may be a two-pack type curable adhesive, or may be a one-pack type curable adhesive. Further, the bonding mechanism of the adhesive component to be used for formation of the adhesive layer 4 is not particularly limited, and may be any one of a chemical reaction type, a solvent volatilization type, a heat melting type and a heat pressing type. Examples thereof include polyester-based resins such as polyethylene terephthalate, polybutylene terephthalate, polyethylene naphthalate, polybutylene naphthalate, polyethylene isophthalate, polycarbonate and copolymerization polyesters; polyether-based adhesives; polyurethane-based adhesives; epoxy-based resins; phenol resin-based resins; polyamide-based resins such as nylon 6, nylon 66, nylon 12 and copolymerization polyamides; polyolefin-based resins such as polyolefins, carboxylic acid-modified polyolefins and metal-modified polyolefins; polyvinyl acetate-based resins; cellulose-based adhesives; (meth)acrylic resins; polyimide-based resins; amino resins such as urea resins and melamine resins; rubbers such as chloroprene rubber, nitrile rubber and styrene-butadiene rubber; and silicone-based resins.

In the first aspect A, the bonding resin composition to be used for formation of the adhesive layer 4 is preferably a resin composition for adhesive layers, which contains a thermosetting resin and a curing accelerator, for reducing the lead time by quickly curing the adhesive layer 4 without requiring aging under a high-temperature condition during production, and further, improving moldability. When a thermosetting resin and a curing accelerator are used in combination, the adhesive layer 3 is quickly cured without requiring aging under a high-temperature condition, so that the lead time can be reduced. When an elastomer resin is further incorporated, moderate flexibility is imparted to the adhesive layer 4 while shrinkage of the adhesive layer 4 during curing is suppressed, so that excellent moldability can be imparted to the battery packaging material.

In the first aspect A, the types of the thermosetting resin and curing accelerator to be used in the resin composition for adhesive layers, the preferred thermosetting resin and curing accelerator, the content thereof and so on are the same as in the coating layer 1 described above.

In formation of the adhesive layer 4 in the second aspect B, resin compositions for adhesive layers, which contain a thermosetting resin and a curing accelerator, are preferably used for reducing the lead time by quickly curing the adhesive layer 4 without requiring aging under a high-temperature condition during production, and further, improving moldability. When a thermosetting resin and a curing accelerator are used in combination, the adhesive layer 4 is quickly cured without requiring aging under a high-temperature condition, so that the lead time can be reduced.

In the second aspect B, the type of the thermosetting resin to be used in the resin composition for adhesive layers, the preferred thermosetting resin, and so on are the same as in the case of the thermosetting resin described above in the section of [Coating Layer 1]. The type of the curing accelerator to be used in the resin composition for adhesive layers, the preferred curing accelerator, and so on are the same as in the case of the curing accelerator described above in the section of [Coating Layer 1]. The content of the curing accelerator in the resin composition for adhesive layers is appropriately determined according to, for example, the type of thermosetting resin and the type of curing accelerator to be used, and for example, the content of the curing accelerator in terms of the total amount is 0.01 to 6 parts by mass, preferably 0.05 to 5 parts by mass, further preferably 0.1 to 2 parts by mass based on 100 parts by mass of the thermosetting resin.

The thickness of the adhesive layer 4 in the first aspect A and the second aspect B is, for example, 2 to 50 μm, preferably 3 to 25 μm.

3. Thickness of Battery Packaging Material

The battery packaging material according to the first aspect A and the second aspect B does not have on the barrier layer 3 a base material layer including an adhesive layer and a resin film, and therefore can be made thinner as compared to a conventional film-shaped battery packaging material. The thickness of the battery packaging material of the present invention is, for example, 40 to 120 µm, preferably 50 to 100 µm.

4. Method for Producing Battery Packaging Material

The method for producing the battery packaging material according to the first aspect A is not particularly limited as long as a laminated body including layers each having a predetermined composition is obtained, and examples thereof include the following method.

In the first aspect A, the method includes a coating layer forming step of applying a resin composition, which contains a thermosetting resin and a curing accelerator, to the barrier layer 2 and heating and thereby curing the resin composition repeatedly two or more times to form on the barrier layer 2 the coating layer 1 having a multilayer structure having two or more layers, wherein before, during or after the coating layer forming step, the sealant layer 3 is laminated on a surface of the barrier layer 2 on a side opposite to a surface on which the coating layer 1 is laminated.

In the first aspect A, the resin composition can be applied to the barrier layer 2 in the coating layer forming step by a coating method such as a gravure coating method or a roll coating method. For heating conditions for curing the resin composition applied onto the barrier layer 2, for example, the temperature is 90 to 200° C., preferably 100 to 190° C., and the time is 0.1 to 60 seconds, preferably 1 to 30 seconds.

Thus, in the first aspect A, the resin composition can be sufficiently cured only with the above-mentioned heating conditions without requiring aging under a high-temperature condition in the coating layer forming step, and therefore the lead time can be considerably reduced.

In the first aspect A, lamination of the sealant layer 3 on the barrier layer 2 may be performed before, during or after the coating layer forming step, but it is preferred that lamination of the sealant layer 3 on the barrier layer 2 is performed after the coating layer forming step. When the sealant layer 3 is to be laminated directly on the barrier layer 2, a resin component that forms the sealant layer 3 may be applied onto the barrier layer 2 by a method such as a gravure coating method or a roll coating method. Examples of the method for providing the adhesive layer 4 between the barrier layer 2 and the sealant layer 3 include (1) a method in which the adhesive layer 4 and the sealant layer 3 are co-extruded to be laminated on the barrier layer 2 (coextrusion lamination method); (2) a method in which a laminated body including the adhesive layer 4 and the sealant layer 3 is formed separately, and the laminated body is laminated on the barrier layer 2 of by a heat lamination method; (3) a method in which an adhesive for formation of the adhesive layer 4 is laminated on the barrier layer 2 by, for example, an extrusion method or a method in which the adhesive is applied by solution coating, dried at a high temperature, and further baked, and the sealant layer 3 formed into a sheet shape beforehand is laminated on the adhesive layer 4 by a thermal lamination method; and (4) a method in which a laminated body A and the sealant layer 3 are bonded to each other with the adhesive layer 4 interposed therebetween while the melted adhesive layer 4 is poured between the barrier layer 2 and the sealant layer 3 formed into a sheet shape beforehand (sandwich lamination method).

In the first aspect A, a laminated body including the coating layer 1 (multilayer having two or more layers), the barrier layer 2, the surface of which is subjected to a chemical conversion treatment as necessary, the adhesive layer 4 provided as necessary, and the sealant layer 3 is formed in the manner described above.

In the battery packaging material A according to the first aspect A, the layers that form the laminated body may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

The method for producing the battery packaging material B according to the second aspect B is not particularly limited as long as a laminated body including layers each having a predetermined composition is obtained, and examples thereof include the following method.

The method includes a coating layer forming step of applying a resin composition, which contains a thermosetting resin and a curing accelerator, onto the barrier layer 2 and heating and curing the resin composition, wherein the coating layer forming step is carried out one or more times, and the resin composition containing reactive resin beads is used at least one time in the coating layer forming step, and before or after the coating layer forming step, the sealant layer 3 is laminated on a surface of the barrier layer 2 on a side opposite to a surface on which the coating layer 1 is laminated.

In the second aspect B, the resin composition for forming the coating layer can be applied to the barrier layer 2 in the coating layer forming step by a coating method such as a gravure coating method or a roll coating method. For heating conditions for curing the resin composition applied onto the barrier layer 2, for example, the temperature is 90 to 200° C., preferably 100 to 190° C., and the time is 0.1 to 60 seconds, preferably 1 to 30 seconds.

Thus, in the second aspect B, the slipping coating layer 1 can be sufficiently cured only with the above-mentioned heating conditions without requiring aging under a high-temperature condition in the coating layer forming step, and therefore the lead time can be considerably reduced.

When the sealant layer 3 is to be laminated directly on the barrier layer 2 in the second aspect B, a resin component that forms the sealant layer 3 may be applied onto the barrier layer 2 by a method such as a gravure coating method or a roll coating method. Examples of the method for providing the adhesive layer 4 between the barrier layer 2 and the sealant layer 3 include (1) a method in which the adhesive layer 4 and the sealant layer 3 are co-extruded to be laminated on the barrier layer 2 (coextrusion lamination method); (2) a method in which a laminated body including the adhesive layer 4 and the sealant layer 3 is formed separately, and the laminated body is laminated on the barrier layer 2 by a heat lamination method; (3) a method in which an adhesive for formation of the adhesive layer 4 is laminated on the barrier layer 2 by, for example, an extrusion method or a method in which the adhesive is applied by solution coating, dried at a high temperature, and further baked, and the sealant layer 3 formed into a sheet shape beforehand is laminated on the adhesive layer 4 by a thermal lamination method; and (4) a method in which a laminated body A and the sealant layer 3 are bonded to each other with the adhesive layer 4 interposed therebetween while the melted adhesive layer 4 is poured between the barrier layer 2 and the sealant layer 3 formed into a sheet shape beforehand (sandwich lamination method).

In the second aspect B, a laminated body including the coating layer 1 having a single-layer or multilayer structure, the barrier layer 2, the surface of which is subjected to a chemical conversion treatment as necessary, the adhesive layer 4 provided as necessary, and the sealant layer 3 is formed in the manner described above.

In the battery packaging material B according to the second aspect B, the layers that form the laminated body may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

5. Use of Battery Packaging Material

The battery packaging material according to the first aspect A and the second aspect B is molded into a desired shape and used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to the first aspect A and the second aspect B such that a flange portion (region where sealant layers 3 are in contact with each other) can be formed on the periphery of the battery element while a metal terminal connected to each of the positive electrode and the negative electrode protrudes to outside, and sealant layers 3 at the flange portion are heat-sealed with each other to hermetically seal the battery element, thereby providing a battery using a battery packaging material. When the battery element is stored using the battery packaging material according to the first aspect A and the second aspect B, the battery packaging material of the present invention is used such that the sealant portion is on the inner side (surface in contact with the battery element).

The battery packaging material according to the first aspect A and the second aspect B may be used for either a primary battery or a secondary battery, but is preferably used for a secondary battery. The type of secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLES

The first aspect A and the second aspect B of the present invention will be described in detail below by showing examples and comparative examples. It is to be noted that the present invention is not particularly limited to examples.

(First Aspect A)

Examples 1A to 87A and Comparative Examples 1A to 15A

[Production of Battery Packaging Material]

A coating layer having a two or three-layer structure was formed on a barrier layer formed of an aluminum foil (thickness: 40 μm) subjected to a chemical conversion treatment at both surfaces. Specifically, a coating layer having a two or three-layer structure was laminated on a barrier layer by sequentially performing application and curing of a resin composition for forming a layer on the barrier layer side in the coating layer, application and curing of a resin composition for forming an intermediate layer in the coating layer, and application and curing of an outermost layer in the coating layer in accordance with the configurations shown in Tables 3A to 8A. The compositions and curing conditions for resin compositions used for formation of the layers that form the coating layer are as shown in Tables 1A and 2A. Elastic moduli determined by pressing an indenter made of diamond tip having a tip in the form of a regular-triangular pyramid (Berkovich type) into a measurement object layer using a nanoindenter, and continuously measuring indentation depths under loading and unloading conditions for the layers that form the coating layer are shown in Tables 1A and 2A.

The chemical conversion treatment of the aluminum foil used as the barrier layer was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry weight), and performing baking for 20 seconds under such conditions that the film temperature was 180° C. or higher.

Thereafter, a sealant layer including two layers was laminated on the barrier layer by co-extruding carboxylic acid-modified polypropylene (disposed on the barrier layer side; thickness: 23 μm) and homopolypropylene (innermost layer; thickness: 23 μm) onto a surface of the barrier layer on which the coating layer was not laminated. Thus, a battery packaging material including a laminated body including a coating layer having a two or three-layer structure, a barrier layer 4 and a sealant layer in this order was obtained.

In the battery packaging materials of Comparative Examples 1A to 15A, at least one layer that forms a coating layer is a layer cured using only a thermosetting resin without including a curing accelerator.

The structures and physical properties of the coating layers of the battery packaging materials of Examples 1A to 87A are as described below.

Examples 1A and 3A: The coating layer has a two-layer structure, and the layer on the barrier layer side and the outermost layer both have an elastic modulus of 1500 to 2499 MPa.

Examples 4A to 7A: The coating layer has a two-layer structure, the layer on the barrier layer side has an elastic modulus of 1500 to 2499 MPa, and the outermost layer has an elastic modulus of 2500 to 5999 MPa.

Examples 8A and 9A: The coating layer has a two-layer structure, the layer on the barrier layer side has an elastic modulus of 1500 to 2499 MPa, and the outermost layer has an elastic modulus of 6000 MPa or more.

Examples 10A to 13A: The coating layer has a two-layer structure, the layer on the barrier layer side has an elastic modulus of 2500 to 5999 MPa, and the outermost layer has an elastic modulus of 1500 to 2499 MPa.

Examples 14A and 15A: The coating layer has a two-layer structure, the layer on the barrier layer side has an elastic modulus of 6000 MPa or more, and the outermost layer has an elastic modulus of 1500 to 2499 MPa.

Examples 16A to 23A: The coating layer has a two-layer structure, and the layer on the barrier layer side and the outermost layer both have an elastic modulus of 2500 to 5999 MPa.

Examples 24A to 26A: The coating layer has a two-layer structure, the layer on the barrier layer side has an elastic modulus of 2500 to 5999 MPa, and the outermost layer has an elastic modulus of 6000 MPa or more.

Example 27A: The coating layer has a two-layer structure, the layer on the barrier layer side has an elastic modulus of 6000 MPa or more, and the outermost layer has an elastic modulus of 1500 to 2499 MPa.

Examples 28A and 29A: The coating layer has a two-layer structure, the layer on the barrier layer side has an elastic modulus of 6000 MPa or more, and the outermost layer has an elastic modulus of 2500 to 5999 MPa.

Example 30A: The coating layer has a two-layer structure, and the layer on the barrier layer side and the outermost layer both have an elastic modulus of 6000 MPa or more.

Examples 31A to 33A: The coating layer has a three-layer structure, and the layer on the barrier layer side, the intermediate layer and the outermost layer all have an elastic modulus of 1500 to 2499 MPa.

Examples 34A to 36A: The coating layer has a three-layer structure, the layer on the barrier layer side and the intermediate layer have an elastic modulus of 1500 to 2499 MPa, and the outermost layer has an elastic modulus of 2500 to 5999 MPa.

Examples 37A to 39A: The coating layer has a three-layer structure, the layer on the barrier layer side and the outermost layer have an elastic modulus of 1500 to 2499 MPa, and the intermediate layer has an elastic modulus of 2500 to 5999 MPa.

Examples 40A to 44A: The coating layer has a three-layer structure, the layer on the barrier layer side has an elastic modulus of 1500 to 2499 MPa, and the intermediate layer and the outermost layer have an elastic modulus of 2500 to 5999 MPa.

Examples 45A to 49A: The coating layer has a three-layer structure, the layer on the barrier layer side has an elastic modulus of 2500 to 5999 MPa, and the intermediate layer and the outermost layer have an elastic modulus of 1500 to 2499 MPa.

Examples 50A to 54A: The coating layer has a three-layer structure, the layer on the barrier layer side and the outermost layer have an elastic modulus of 2500 to 5999 MPa, and the intermediate layer has an elastic modulus of 1500 to 2499 MPa.

Examples 55A to 59A: The coating layer has a three-layer structure, the layer on the barrier layer side and the intermediate layer have an elastic modulus of 2500 to 5999 MPa, and the outermost layer has an elastic modulus of 1500 to 2499 MPa.

Examples 60A to 63A: The coating layer has a three-layer structure, and the layer on the barrier layer side, the intermediate layer and the outermost layer all have an elastic modulus of 2500 to 5999 MPa.

Examples 64A to 87A: The coating layer has a three-layer structure, the layer on the barrier layer side has an elastic modulus of 1500 to 2499 MPa, the intermediate layer and the outermost layer have an elastic modulus of 2500 to 5999 MPa, and the outermost layer contains a slipping agent.

TABLE 1A

| | Composition of resin composition used | | | | | | | | |
|---|---|---|---|---|---|---|---|---|---|
| | Thermosetting resin | | | Curing accelerator | | Slipping agent | | | |
| | Main agent | Curing agent | Content (parts by mass) | Type | Content (parts by mass) | Type | Content (parts by mass) | Curing condition | Thickness (μm) | Elastic modulus (MPa) |
| Layer 1a | Polyol compound A | Aromatic isocyanate | 100 | — | — | — | — | 80° C., 7 days | 5 | 2000 |
| Layer 2a | Polyol compound A | Aliphatic isocyanate | 100 | — | — | — | — | 80° C., 7 days | 5 | 1600 |
| Layer 3a | Epoxy resin A | Acid anhydride | 100 | — | — | — | — | 80° C., 7 days | 5 | 400 |
| Layer 4a | Epoxy resin B | Acid anhydride | 100 | — | — | — | — | 80° C., 7 days | 5 | 900 |

TABLE 2A

| | Composition of resin composition used | | | | | | | | |
|---|---|---|---|---|---|---|---|---|---|
| | Thermosetting resin | | | Curing accelerator | | Slipping agent | | | |
| | Main agent | Curing agent | Content (parts by mass) | Type | Content (parts by mass) | Type | Content (parts by mass) | Curing condition | Thickness (μm) | Elastic modulus (MPa) |
| Layer 1b | Polyol compound A | Aromatic isocyanate | 100 | Imidazole compound | 1 | — | — | 120° C., 30 seconds | 5 | 2200 |
| Layer 2b | Polyol compound A | Aliphatic isocyanate | 100 | Imidazole compound | 1 | — | — | 120° C., 30 seconds | 5 | 1700 |
| Layer 3b | Polyol compound B | Aromatic isocyanate | 100 | Imidazole compound | 1 | — | — | 120° C., 30 seconds | 5 | 4500 |
| Layer 4b | Polyol compound B | Aliphatic isocyanate | 100 | Imidazole compound | 1 | — | — | 120° C., 30 seconds | 5 | 3500 |
| Layer 5b | Polyol compound A | Aromatic isocyanate | 100 | DBU salt | 1 | — | — | 120° C., 30 seconds | 5 | 2000 |
| Layer 6b | Polyol compound A | Aliphatic isocyanate | 100 | DBU salt | 1 | — | — | 120° C., 30 seconds | 5 | 1500 |

TABLE 2A-continued

| | Composition of resin composition used | | | | | | | | |
|---|---|---|---|---|---|---|---|---|---|
| | Thermosetting resin | | | Curing accelerator | | Slipping agent | | | |
| | Main agent | Curing agent | Content (parts by mass) | Type | Content (parts by mass) | Type | Content (parts by mass) | Curing condition | Thickness (μm) | Elastic modulus (MPa) |
| Layer 7b | Polyol compound B | Aromatic isocyanate | 100 | DBU salt | 1 | — | — | 120° C., 30 seconds | 5 | 4000 |
| Layer 8b | Polyol compound B | Aliphatic isocyanate | 100 | DBU salt | 1 | — | — | 120° C., 30 seconds | 5 | 3000 |
| Layer 9b | Epoxy resin A | Acid anhydride | 100 | Imidazole compound | 1 | — | — | 120° C., 30 seconds | 5 | 2500 |
| Layer 10b | Epoxy resin A | Acid anhydride | 100 | DBU salt | 1 | — | — | 120° C., 30 seconds | 5 | 2500 |
| Layer 11b | Epoxy resin B | Acid anhydride | 100 | Imidazole compound | 1 | — | — | 120° C., 30 seconds | 5 | 4000 |
| Layer 12b | Epoxy resin B | Acid anhydride | 100 | DBU salt | 1 | — | — | 120° C., 30 seconds | 5 | 4000 |
| Layer 13b | Polyol compound A | Amino resin | 100 | Sulfonium salt | 1 | — | — | 120° C., 30 seconds | 5 | 5800 |
| Layer 14b | Polyol compound B | Amino resin | 100 | Sulfonium salt | 1 | — | — | 120° C., 30 seconds | 5 | 6100 |
| Layer 15b | Polyol compound B | Aromatic isocyanate | 100 | Imidazole compound | 1 | Slipping agent A | 1 | 120° C., 30 seconds | 5 | 4500 |
| Layer 16b | Polyol compound B | Aromatic isocyanate | 100 | Imidazole compound | 1 | Slipping agent B | 1 | 120° C., 30 seconds | 5 | 4500 |
| Layer 17b | Polyol compound B | Aromatic isocyanate | 100 | Imidazole compound | 1 | Slipping agent C | 1 | 120° C., 30 seconds | 5 | 4500 |
| Layer 18b | Polyol compound B | Aromatic isocyanate | 100 | Imidazole compound | 1 | Slipping agent D | 1 | 120° C., 30 seconds | 5 | 4500 |
| Layer 19b | Polyol compound B | Aromatic isocyanate | 100 | Imidazole compound | 1 | Slipping agent E | 1 | 120° C., 30 seconds | 5 | 4500 |
| Layer 20b | Polyol compound B | Aromatic isocyanate | 100 | Imidazole compound | 1 | Slipping agent F | 1 | 120° C., 30 seconds | 5 | 4500 |

Components used for formation of layers that form the coating layer as shown in Tables 1A and 2A are as follows.
Polyol compound A: urethane polyol having a molecular weight of 8000 to 50000 and a hydroxyl value of less than 40
Polyol compound B: aliphatic polyol having a molecular weight of 500 to 3000 and a hydroxyl value of 70 or more
Epoxy resin A: bisphenol A-type epoxy resin having a molecular weight of 200 to 1000
Epoxy resin B: phenol novolac-type epoxy resin having a molecular weight of 200 to 1000
Aromatic isocyanate: MDI (diphenylmethane diisocyanate adduct)
Aliphatic isocyanate: IPDI (isophorone diisocyanate)
Imidazole compound: imidazole compound that accelerates the crosslinking reaction of the thermosetting resin at 80 to 150° C.
DBU salt: octylic acid salt acid anhydride of 1,8-diazabicyclo[5.4.0]undec-7-ene: methylhexahydrophthalic anhydride
Amino resin: benzoguanamine resin
Slipping agent A: erucic acid amide
Slipping agent B: ethylene bis-oleic acid amide
Slipping agent C: behenic acid amide
Slipping agent D: terminal-silicon block copolymer; trade name "MODIPER FS710" (manufactured by NOF CORPORATION); block copolymer with a (functional group-containing) compatible segment coupled at the end of a silicon segment
Slipping agent E: terminal-fluorine block polymer; trade name "MODIPER F206" (manufactured by NOF CORPORATION); block copolymer with a (functional group-containing) compatible segment coupled at the end of a fluorine segment
Slipping agent F: silicone-modified acrylic resin, trade name "SYMAC US270" (manufactured by NOF CORPORATION); silicone-modified acrylic resin with silicone graft-polymerized with an acrylic resin containing a functional group

[Evaluation on Occurrence of Creases]

For each battery packaging material obtained as described above, whether creases occurred or not was visually checked, and the ratio of the number of samples in which creases occurred per 50 battery packaging materials (heat crease defect ratio: %) was calculated.

[Evaluation of Moldability]

Each battery packaging material obtained as described above was cut to prepare a strip piece of 120×80 mm, and the strip piece was used as a test sample. A straight mold including a rectangular male mold of 30×50 mm, and a female mold with a clearance of 0.5 mm from the male mold was provided, the test sample was placed on the female mold in such a manner that the thermally bondable resin layer was situated on the male mold side, the test sample was pressed at a pressing pressure (surface pressure) of 0.1 MPa with the molding depth set to 3.5 to 5.5 mm, and cold molding (draw-in one-step molding) was performed. Presence/absence of pinholes and cracks in the metal layer in each of the molded test samples was checked, and the ratio of occurrence (%) of pinholes and cracks was calculated. For the ratio of occurrence of pinholes and cracks, a test sample having at least one pinhole or crack after being molded as described above was discriminated as a molding defective product, and the ratio of molding defective products occurring at the time of molding 100 test samples under the above-mentioned conditions was determined. The test was passed when the ratio of molding defective products was less than 5%, and the test was not passed when the ratio of molding defective products was 5% or more. Moldability was evaluated by classifying the obtained results in accordance with the following criteria. In the following criteria, ranks A to D indicate that there is no problem in quality from a practical standpoint.

(Evaluation Criteria of Moldability)
A: passed at a molding depth of 5.5 mm.
B: not passed at a molding depth of 5.5 mm, and passed at a molding depth of 5.0 mm.
C: not passed at a molding depth of 5.0 mm, and passed at a molding depth of 4.5 mm.
D: not passed at a molding depth of 4.5 mm, and passed at a molding depth of 4.0 mm.
E: not passed at a molding depth of 4.0 mm, and passed at a molding depth of 3.5 mm.
F: not passed at a molding depth of 3.5 mm.

[Evaluation of Chemical Resistance]
Onto the chemical-resistant coating layer of each battery packaging material obtained as described above, 0.5 ml of a chemical (electrolytic solution, ethanol, methyl ethyl ketone (MEK), ethyl acetate or toluene) was dropped, and the coating layer was covered with a watch glass. After the battery packaging material was left standing at room temperature for 3 hours, the chemical on the chemical-resistant coating layer was wiped off with gauze, the state of the surface of the chemical-resistant coating layer of the battery packaging material was visually observed, and evaluation was performed based on the following criteria.

(Evaluation Criteria of Chemical Resistance)
◯: No traces were observed on the surface for any of the chemicals.
Δ: Defects such as whitening, swelling and peeling were observed on the surface for at least one of the chemicals, but no traces were observed on the surface for some of the chemicals.
x: Defects such as whitening, swelling and peeling were observed on the surface for all the chemicals.

[Evaluation Results]
The obtained results are shown in Tables 3A to 8A. These results show that when at least one layer that formed the coating layer was cured using only a thermosetting resin without including a curing accelerator, long-time aging was required for performing curing, and the product defect ratio increased due to occurrence of creases caused by heat (Comparative Examples 1A to 15A). On the other hand, when all the layers that formed the coating layer were cured using a thermosetting resin and a curing accelerator, curing was performed in a short time, and further, occurrence of creases caused by heat was suppressed (Examples 1A to 87A).

From these results, it has become evident that when all the layers that form the coating layer have an elastic modulus of 1500 to 6000 MPa, moldability is improved, and further, when the outermost layer contains a slipping agent, prominent moldability can be achieved. Further, it has been confirmed that when the outermost layer in the coating layer has an elastic modulus of 3000 MPa or more, excellent chemical resistance is achieved.

TABLE 3A

|  | Laminated structure of coating layer | | | Evaluation results | | |
|---|---|---|---|---|---|---|
|  | Layer on barrier layer side | Intermediate layer | Outermost layer | Heat crease defect ratio (%) | Moldability | Chemical resistance |
| Comparative Example 1A | 1a (2000 MPa) | — | 2a (1600 MPa) | 20% | E | X |
| Comparative Example 2A | 1a (2000 MPa) | — | 3a (400 MPa) | 20% | F | X |
| Comparative Example 3A | 2a (1600 MPa) | — | 3a (400 MPa) | 20% | F | X |
| Comparative Example 4A | 2a (1600 MPa) | — | 4a (900 MPa) | 20% | F | X |
| Comparative Example 5A | 3a (400 MPa) | — | 1a (2000 MPa) | 20% | F | X |
| Comparative Example 6A | 1a (2000 MPa) | — | 1b (2200 MPa) | 20% | E | X |
| Comparative Example 7A | 1a (2000 MPa) | — | 3b (4500 MPa) | 20% | D | ◯ |
| Comparative Example 8A | 3a (400 MPa) | — | 1b (2200 MPa) | 20% | F | X |
| Comparative Example 9A | 3a (400 MPa) | — | 3b (4500 MPa) | 20% | F | ◯ |
| Comparative Example 10A | 1b (2200 MPa) | — | 1a (2000 MPa) | 20% | E | X |
| Comparative Example 11A | 3b (4500 MPa) | — | 3a (400 MPa) | 20% | F | X |
| Comparative Example 12A | 4b (3500 MPa) | 1a (2000 MPa) | 3b (4500 MPa) | 20% | B | ◯ |
| Comparative Example 13A | 4b (3500 MPa) | 3a (400 MPa) | 3b (4500 MPa) | 20% | D | ◯ |
| Comparative Example 14A | 4b (3500 MPa) | 7b (4000 MPa) | 1a (2000 MPa) | 20% | B | X |
| Comparative Example 15A | 4b (3500 MPa) | 7b (4000 MPa) | 3a (400 MPa) | 20% | D | X |

In the column for each layer that forms the coating layer, a symbol such as "1a" shows the type of a layer as shown in Tables 1A and 2A, and the parenthesized value shows the elastic modulus of the layer.

TABLE 4A

| | Laminated structure of coating layer | | | Evaluation results | | |
|---|---|---|---|---|---|---|
| | Layer on barrier layer side | Intermediate layer | Outermost layer | Heat crease defect ratio (%) | Moldability | Chemical resistance |
| Example 1A | 1b (2200 MPa) | — | 5b (2000 MPa) | 0 | D | X |
| Example 2A | 2b (1700 MPa) | — | 1b (2200 MPa) | 0 | D | X |
| Example 3A | 5b (2000 MPa) | — | 1b (2200 MPa) | 0 | D | X |
| Example 4A | 1b (2200 MPa) | — | 3b (4500 MPa) | 0 | C | ○ |
| Example 5A | 1b (2200 MPa) | — | 9b (2500 MPa) | 0 | C | ○ |
| Example 6A | 1b (2200 MPa) | — | 13b (5800 MPa) | 0 | C | ○ |
| Example 7A | 1b (2200 MPa) | — | 7b (4000 MPa) | 0 | C | ○ |
| Example 8A | 1b (2200 MPa) | — | 14b (6100 MPa) | 0 | E | ○ |
| Example 9A | 6b (1500 MPa) | — | 14b (6100 MPa) | 0 | E | ○ |
| Example 10A | 3b (4500 MPa) | — | 1b (2200 MPa) | 0 | C | X |
| Example 11A | 3b (4500 MPa) | — | 6b (1500 MPa) | 0 | C | X |
| Example 12A | 11b (4000 MPa) | — | 2b (1700 MPa) | 0 | C | X |
| Example 13A | 13b (5800 MPa) | — | 2b (1700 MPa) | 0 | C | X |
| Example 14A | 14b (6100 MPa) | — | 1b (2200 MPa) | 0 | F | X |
| Example 15A | 14b (6100 MPa) | — | 5b (2000 MPa) | 0 | F | X |
| Example 16A | 3b (4500 MPa) | — | 4b (3500 MPa) | 0 | C | ○ |
| Example 17A | 3b (4500 MPa) | — | 10b (2500 MPa) | 0 | C | ○ |
| Example 18A | 3b (4500 MPa) | — | 13b (5800 MPa) | 0 | C | ○ |

In the column for each layer that forms the coating layer, a symbol such as "1b" shows the type of a layer as shown in Table 2A, and the parenthesized value shows the elastic modulus of the layer.

TABLE 5A

| | Laminated structure of coating layer | | | Evaluation results | | |
|---|---|---|---|---|---|---|
| | Layer on barrier layer side | Intermediate layer | Outermost layer | Heat crease defect ratio (%) | Moldability | Chemical resistance |
| Example 19A | 10b (2500 MPa) | — | 3b (4500 MPa) | 0 | C | ○ |
| Example 20A | 10b (2500 MPa) | — | 8b (3000 MPa) | 0 | C | ○ |
| Example 21A | 10b (2500 MPa) | — | 11b (4000 MPa) | 0 | C | ○ |
| Example 22A | 13b (5800 MPa) | — | 3b (4500 MPa) | 0 | C | ○ |
| Example 23A | 13b (5800 MPa) | — | 12b (4000 MPa) | 0 | C | ○ |
| Example 24A | 1b (2200 MPa) | — | 14b (6100 MPa) | 0 | E | ○ |
| Example 25A | 11b (4000 MPa) | — | 14b (6100 MPa) | 0 | E | ○ |
| Example 26A | 13b (5800 MPa) | — | 14b (6100 MPa) | 0 | E | ○ |
| Example 27A | 14b (6100 MPa) | — | 1b (2200 MPa) | 0 | F | X |
| Example 28A | 14b (6100 MPa) | — | 11b (4000 MPa) | 0 | F | ○ |
| Example 29A | 14b (6100 MPa) | — | 13b (5800 MPa) | 0 | F | ○ |
| Example 30A | 14b (6100 MPa) | — | 14b (6100 MPa) | 0 | F | ○ |
| Example 31A | 1b (2200 MPa) | 5b (2000 MPa) | 2b (1700 MPa) | 0 | D | X |
| Example 32A | 6b (1500 MPa) | 1b (2200 MPa) | 5b (2000 MPa) | 0 | D | X |
| Example 33A | 2b (1700 MPa) | 6b (1500 MPa) | 5b (2000 MPa) | 0 | D | X |
| Example 34A | 1b (2200 MPa) | 5b (2000 MPa) | 7b (4000 MPa) | 0 | B | ○ |
| Example 35A | 6b (1500 MPa) | 1b (2200 MPa) | 10b (2500 MPa) | 0 | B | ○ |
| Example 36A | 2b (1700 MPa) | 6b (1500 MPa) | 13b (5800 MPa) | 0 | B | ○ |

In the column for each layer that forms the coating layer, a symbol such as "1b" shows the type of a layer as shown in Table 2A, and the parenthesized value shows the elastic modulus of the layer.

TABLE 6A

| | Laminated structure of coating layer | | | Evaluation results | | |
|---|---|---|---|---|---|---|
| | Layer on barrier layer side | Intermediate layer | Outermost layer | Heat crease defect ratio (%) | Moldability | Chemical resistance |
| Example 37A | 1b (2200 MPa) | 3b (4500 MPa) | 5b (2000 MPa) | 0 | B | X |
| Example 38A | 6b (1500 MPa) | 10b (2500 MPa) | 2b (1700 MPa) | 0 | B | X |
| Example 39A | 2b (1700 MPa) | 13b (5800 MPa) | 1b (2200 MPa) | 0 | B | X |
| Example 40A | 1b (2200 MPa) | 4b (3500 MPa) | 7b (4000 MPa) | 0 | B | ○ |
| Example 41A | 1b (2200 MPa) | 10b (2500 MPa) | 13b (5800 MPa) | 0 | B | ○ |
| Example 42A | 1b (2200 MPa) | 13b (5800 MPa) | 12b (4000 MPa) | 0 | B | ○ |
| Example 43A | 6b (1500 MPa) | 10b (2500 MPa) | 4b (3500 MPa) | 0 | B | ○ |
| Example 44A | 2b (1700 MPa) | 13b (5800 MPa) | 12b (4000 MPa) | 0 | B | ○ |
| Example 45A | 4b (3500 MPa) | 2b (1700 MPa) | 1b (2200 MPa) | 0 | B | X |
| Example 46A | 4b (3500 MPa) | 6b (1500 MPa) | 1b (2200 MPa) | 0 | B | X |
| Example 47A | 4b (3500 MPa) | 1b (2200 MPa) | 5b (2000 MPa) | 0 | B | X |

TABLE 6A-continued

|  | Laminated structure of coating layer | | | Evaluation results | | |
| --- | --- | --- | --- | --- | --- | --- |
|  | Layer on barrier layer side | Intermediate layer | Outermost layer | Heat crease defect ratio (%) | Moldability | Chemical resistance |
| Example 48A | 13b (5800 MPa) | 6b (1500 MPa) | 1b (2200 MPa) | 0 | B | X |
| Example 49A | 13b (5800 MPa) | 1b (2200 MPa) | 5b (2000 MPa) | 0 | B | X |
| Example 50A | 3b (4500 MPa) | 1b (2200 MPa) | 8b (3000 MPa) | 0 | B | ○ |
| Example 51A | 3b (4500 MPa) | 2b (1700 MPa) | 11b (4000 MPa) | 0 | B | ○ |
| Example 52A | 3b (4500 MPa) | 6b (1500 MPa) | 13b (5800 MPa) | 0 | B | ○ |
| Example 53A | 8b (3000 MPa) | 2b (1700 MPa) | 10b (2500 MPa) | 0 | B | ○ |
| Example 54A | 11b (4000 MPa) | 6b (1500 MPa) | 3b (4500 MPa) | 0 | B | ○ |

In the column for each layer that forms the coating layer, a symbol such as "1b" shows the type of a layer as shown in Table 2A, and the parenthesized value shows the elastic modulus of the layer.

TABLE 7A

|  | Laminated structure of coating layer | | | Evaluation results | | |
| --- | --- | --- | --- | --- | --- | --- |
|  | Layer on barrier layer side | Intermediate layer | Outermost layer | Heat crease defect ratio (%) | Moldability | Chemical resistance |
| Example 55A | 3b (4500 MPa) | 4b (3500 MPa) | 1b (2200 MPa) | 0 | B | ○ |
| Example 56A | 3b (4500 MPa) | 9b (2500 MPa) | 5b (2000 MPa) | 0 | B | ○ |
| Example 57A | 3b (4500 MPa) | 13b (5800 MPa) | 6b (1500 MPa) | 0 | B | ○ |
| Example 58A | 10b (2500 MPa) | 7b (4000 MPa) | 1b (2200 MPa) | 0 | B | ○ |
| Example 59A | 13b (5800 MPa) | 3b (4500 MPa) | 5b (2000 MPa) | 0 | B | ○ |
| Example 60A | 3b (4500 MPa) | 4b (3500 MPa) | 3b (4500 MPa) | 0 | B | ○ |
| Example 61A | 7b (4000 MPa) | 13b (5800 MPa) | 8b (3000 MPa) | 0 | B | ○ |
| Example 62A | 11b (4000 MPa) | 3b (4500 MPa) | 8b (3000 MPa) | 0 | B | ○ |
| Example 63A | 13b (5800 MPa) | 3b (4500 MPa) | 4b (3500 MPa) | 0 | B | ○ |
| Example 64A | 1b (2200 MPa) | 4b (3500 MPa) | 15b (4500 MPa) | 0 | A | ○ |
| Example 65A | 1b (2200 MPa) | 11b (4000 MPa) | 15b (4500 MPa) | 0 | A | ○ |
| Example 66A | 1b (2200 MPa) | 13b (5800 MPa) | 15b (4500 MPa) | 0 | A | ○ |
| Example 67A | 6b (1500 MPa) | 12b (4000 MPa) | 15b (4500 MPa) | 0 | A | ○ |
| Example 68A | 1b (2200 MPa) | 4b (3500 MPa) | 16b (4500 MPa) | 0 | A | ○ |
| Example 69A | 1b (2200 MPa) | 11b (4000 MPa) | 16b (4500 MPa) | 0 | A | ○ |
| Example 70A | 1b (2200 MPa) | 13b (5800 MPa) | 16b (4500 MPa) | 0 | A | ○ |
| Example 71A | 6b (1500 MPa) | 12b (4000 MPa) | 16b (4500 MPa) | 0 | A | ○ |

In the column for each layer that forms the coating layer, a symbol such as "1b" shows the type of a layer as shown in Table 2A, and the parenthesized value shows the elastic modulus of the layer.

TABLE 8A

|  | Laminated structure of coating layer | | | Evaluation results | | |
| --- | --- | --- | --- | --- | --- | --- |
|  | Layer on barrier layer side | Intermediate layer | Outermost layer | Heat crease defect ratio (%) | Moldability | Chemical resistance |
| Example 72A | 1b (2200 MPa) | 4b (3500 MPa) | 17b (4500 MPa) | 0 | A | ○ |
| Example 73A | 1b (2200 MPa) | 11b (4000 MPa) | 17b (4500 MPa) | 0 | A | ○ |
| Example 74A | 1b (2200 MPa) | 13b (5800 MPa) | 17b (4500 MPa) | 0 | A | ○ |
| Example 75A | 6b (1500 MPa) | 12b (4000 MPa) | 17b (4500 MPa) | 0 | A | ○ |
| Example 76A | 1b (2200 MPa) | 4b (3500 MPa) | 18b (4500 MPa) | 0 | A | ○ |
| Example 77A | 1b (2200 MPa) | 11b (4000 MPa) | 18b (4500 MPa) | 0 | A | ○ |
| Example 78A | 1b (2200 MPa) | 13b (5800 MPa) | 18b (4500 MPa) | 0 | A | ○ |
| Example 79A | 6b (1500 MPa) | 12b (4000 MPa) | 18b (4500 MPa) | 0 | A | ○ |
| Example 80A | 1b (2200 MPa) | 4b (3500 MPa) | 19b (4500 MPa) | 0 | A | ○ |
| Example 81A | 1b (2200 MPa) | 11b (4000 MPa) | 19b (4500 MPa) | 0 | A | ○ |
| Example 82A | 1b (2200 MPa) | 13b (5800 MPa) | 19b (4500 MPa) | 0 | A | ○ |
| Example 83A | 6b (1500 MPa) | 12b (4000 MPa) | 19b (4500 MPa) | 0 | A | ○ |
| Example 84A | 1b (2200 MPa) | 4b (3500 MPa) | 20b (4500 MPa) | 0 | A | ○ |
| Example 85A | 1b (2200 MPa) | 11b (4000 MPa) | 20b (4500 MPa) | 0 | A | ○ |

TABLE 8A-continued

| | Laminated structure of coating layer | | | Evaluation results | | |
|---|---|---|---|---|---|---|
| | Layer on barrier layer side | Intermediate layer | Outermost layer | Heat crease defect ratio (%) | Moldability | Chemical resistance |
| Example 86A | 1b (2200 MPa) | 13b (5800 MPa) | 20b (4500 MPa) | 0 | A | ○ |
| Example 87A | 6b (1500 MPa) | 12b (4000 MPa) | 20b (4500 MPa) | 0 | A | ○ |

In the column for each layer that forms the coating layer, a symbol such as "1b" shows the type of a layer as shown in Table 2A, and the parenthesized value shows the elastic modulus of the layer.

Examples 88A to 157A

[Production of Battery Packaging Material]

In Examples 88A to 105A, a battery packaging material including a laminated body including a coating layer having a two-layer structure, a barrier layer and a sealant layer in this order was produced under the same conditions as described above except that as resin compositions for forming the coating layer, those described below were used.

Resin composition used for formation of layer on the barrier layer side in coating layer: resin composition with carbon black (average particle size: 0.2 μm) at a ratio as shown in Table 9A to the resin composition used for formation of layer 13b.

Resin composition used for formation of outermost layer in coating layer: resin composition with carbon black (average particle size: 0.2 μm) at a ratio as shown in Table 9A to the resin composition used for formation of layer 12b.

In Examples 106A to 147A, a battery packaging material including a laminated body including a coating layer having a three-layer structure, a barrier layer and a sealant layer in this order was produced under the same conditions as described above except that as resin compositions for forming the coating layer, those described below were used.

Resin composition used for formation of layer on the barrier layer side in coating layer: resin composition with carbon black (average particle size: 0.2 μm) at a ratio as shown in Tables 10A and 11A to the resin composition used for formation of layer 1b.

Resin composition used for formation of intermediate layer in coating layer: resin composition with carbon black (average particle size: 0.2 μm) at a ratio as shown in Tables 10A and 11A to the resin composition used for formation of layer 10b.

Resin composition used for formation of outermost layer in coating layer: resin composition with carbon black (average particle size: 0.2 μm) at a ratio as shown in Tables 10A and 11A to the resin composition used for formation of layer 13b.

[Evaluation of Discriminability]

For the obtained battery packaging materials and the battery packaging materials of Examples 23A and 41A, the color tone on the coating layer side was visually observed to determine visibility of color (black) given by carbon black blended in the coating layer, and evaluation was performed in accordance with the following criteria.

(Evaluation Criteria of Discriminability)

A: The state of being black can be clearly visually recognized.

B: The state of being black can be slightly visually recognized.

C: The state of being black cannot be visually recognized.

[Evaluation of Molding Suitability]

For the obtained battery packaging materials and the battery packaging materials of Examples 23A and 41A, molding was performed under the same conditions as described above, moldability, and the color tone of the stretched part after molding were evaluated in accordance with the following criteria.

(Moldability)

A: The molding depth where the test is passed is the same as that for the control battery packaging material.

B: The molding depth where the test is passed decreases by 0.5 mm or less as compared to that for the control battery packaging material.

C: The molding depth where the test is passed decreases by more than 0.5 mm and not more than 1.0 mm as compared to the control battery packaging material.

D: The molding depth where the test is passed decreases by more than 1.0 mm as compared to the control battery packaging material.

In the battery packaging materials of Examples 88A to 109A, the battery packaging material of Example 23A was used as a control battery packaging material. In the battery packaging materials of Examples 110A to 158A, the battery packaging material of Example 41A was used as a control battery packaging material. The battery packaging materials of Examples 88A to 109A and the battery packaging materials of Examples 110A to 158A have the same configuration as that of the battery packaging material of Example 23A and that of the battery packaging material of Example 41A respectively except that carbon black is contained.

(Color Tone of Stretched Part after Molding)

A: There is no difference in color tone between the stretched part and the non-stretched part.

B: There is a slight difference in color tone between the stretched part and the non-stretched part.

C: There is a clear difference in color tone between the stretched part and the non-stretched part.

[Evaluation Results]

The obtained results are shown in Tables 9A to 11A. From these results, it has been confirmed that by adding an inorganic pigment (carbon black) to at least one layer that forms the coating layer, a color tone can be given to the battery packaging material to impart discriminability thereto. It has been also confirmed that when the amount of the inorganic pigment added is 30 parts by mass or less, particularly 15 parts by mass or less based on 100 parts by mass of the thermosetting resin, deterioration of moldability can be effectively suppressed. Further, it has become evident that by adding the inorganic pigment to at least two layers, particularly three layers among the layers that form the coating layer, occurrence of a difference in color tone between the molded part and the non-molded part after molding can be effectively suppressed. As a result of measuring the heat conductivity of the battery packaging material with carbon black contained in the coating layer, the battery packaging material had a heat conductivity of about 60 W/m·K or more, and was thus confirmed to have excellent heat dissipation property.

TABLE 9A

| | Amount of carbon black contained in each layer that forms coating layer (ratio based on 100 parts by mass of thermosetting resin contained in each layer: parts by mass) | | | Molding suitability | |
|---|---|---|---|---|---|
| | Layer on barrier layer side | Outermost layer | Discriminability | Moldability | Color tone of stretched part |
| Example 41A | 0 | 0 | C | A | C |
| Example 88A | 1 | 0 | B | A | C |
| Example 89A | 3 | 0 | A | A | C |
| Example 90A | 5 | 0 | A | A | C |
| Example 91A | 15 | 0 | A | B | C |
| Example 92A | 20 | 0 | A | B | C |
| Example 93A | 30 | 0 | A | C | C |
| Example 94A | 0 | 1 | B | A | C |
| Example 95A | 0 | 3 | A | A | C |
| Example 96A | 0 | 5 | A | A | C |
| Example 97A | 0 | 15 | A | B | C |
| Example 98A | 0 | 20 | A | B | C |
| Example 99A | 0 | 30 | A | C | C |
| Example 100A | 1 | 1 | B | A | B |
| Example 101A | 3 | 3 | A | A | B |
| Example 102A | 5 | 5 | A | A | B |
| Example 103A | 15 | 15 | A | B | B |
| Example 104A | 20 | 20 | A | B | B |
| Example 105A | 30 | 30 | A | C | B |

TABLE 10A

| | Amount of carbon black contained in each layer that forms coating layer (ratio based on 100 parts by mass of thermosetting resin contained in each layer: parts by mass) | | | | Molding suitability | |
|---|---|---|---|---|---|---|
| | Layer on barrier layer side | Outermost layer | Outermost layer | Discriminability | Moldability | Color tone of stretched part |
| Example 41A | 0 | 0 | 0 | C | A | C |
| Example 106A | 3 | 0 | 0 | B | A | C |
| Example 107A | 5 | 0 | 0 | A | A | C |
| Example 108A | 15 | 0 | 0 | A | A | C |
| Example 109A | 20 | 0 | 0 | A | B | C |
| Example 110A | 30 | 0 | 0 | A | B | C |
| Example 111A | 35 | 0 | 0 | A | C | C |
| Example 112A | 0 | 3 | 0 | B | A | C |
| Example 113A | 0 | 5 | 0 | A | A | C |
| Example 114A | 0 | 15 | 0 | A | A | C |
| Example 115A | 0 | 20 | 0 | A | B | C |
| Example 116A | 0 | 30 | 0 | A | B | C |
| Example 117A | 0 | 35 | 0 | A | C | C |
| Example 118A | 0 | 0 | 3 | B | A | C |
| Example 119A | 0 | 0 | 5 | A | A | C |
| Example 120A | 0 | 0 | 15 | A | A | C |
| Example 121A | 0 | 0 | 20 | A | B | C |
| Example 122A | 0 | 0 | 30 | A | B | C |
| Example 123A | 0 | 0 | 35 | A | C | C |

TABLE 11A

| | Amount of carbon black contained in each layer that forms coating layer (ratio based on 100 parts by mass of thermosetting resin contained in each layer: parts by mass) | | | | Molding suitability | |
|---|---|---|---|---|---|---|
| | Layer on barrier layer side | Outermost layer | Outermost layer | Discriminability | Moldability | Color tone of stretched part |
| Example 124A | 3 | 3 | 0 | B | A | B |
| Example 125A | 5 | 5 | 0 | A | A | B |

TABLE 11A-continued

| | Amount of carbon black contained in each layer that forms coating layer (ratio based on 100 parts by mass of thermosetting resin contained in each layer: parts by mass) | | | | Molding suitability | |
|---|---|---|---|---|---|---|
| | Layer on barrier layer side | Outermost layer | Outermost layer | Discriminability | Moldability | Color tone of stretched part |
| Example 126A | 15 | 15 | 0 | A | A | B |
| Example 127A | 20 | 20 | 0 | A | B | B |
| Example 128A | 30 | 30 | 0 | A | B | B |
| Example 129A | 35 | 35 | 0 | A | C | B |
| Example 130A | 3 | 0 | 3 | B | A | B |
| Example 131A | 5 | 0 | 5 | A | A | B |
| Example 132A | 15 | 0 | 15 | A | A | B |
| Example 133A | 20 | 0 | 20 | A | B | B |
| Example 134A | 30 | 0 | 30 | A | B | B |
| Example 135A | 35 | 0 | 35 | A | C | B |
| Example 136A | 0 | 3 | 3 | B | A | B |
| Example 137A | 0 | 5 | 5 | A | A | B |
| Example 138A | 0 | 15 | 15 | A | A | B |
| Example 139A | 0 | 20 | 20 | A | B | B |
| Example 140A | 0 | 30 | 30 | A | B | B |
| Example 141A | 0 | 35 | 35 | A | C | B |
| Example 142A | 3 | 3 | 3 | B | A | A |
| Example 143A | 5 | 5 | 5 | A | A | A |
| Example 144A | 15 | 15 | 15 | A | A | A |
| Example 145A | 20 | 20 | 20 | A | B | A |
| Example 146A | 30 | 30 | 30 | A | B | A |
| Example 147A | 35 | 35 | 35 | A | C | A |

(Second Aspect B)

(1) Production and Evaluation of Battery Packaging Material Including Coating Layer Having a Two-Layer Structure-1

[Production of Battery Packaging Material 1]

A coating layer having a two-layer structure was formed on a barrier layer formed of an aluminum foil (thickness: 40 μm) subjected to a chemical conversion treatment at both surfaces. Specifically, a resin composition A2 having a composition as described below was applied to the barrier layer in such a manner that the thickness after curing was 5 μm, and the resin composition A2 was cured at 120° C. for 30 seconds to form a second coating layer. A resin composition A1 having a composition as described below was then applied onto the second coating layer in such a manner that the thickness after curing was 5 μm, and the resin composition A1 was cured at 120° C. for 30 seconds to form a first coating layer. The chemical conversion treatment of the aluminum foil used as the barrier layer was performed by applying to both the surfaces of the aluminum foil a treatment liquid including a phenol resin, a chromium fluoride compound and phosphoric acid using a roll coating method in such a manner that the application amount of chromium was 10 mg/m² (dry weight), and performing baking for 20 seconds under such conditions that the film temperature was 180° C. or higher.

Thereafter, a sealant layer including two layers was laminated on the barrier layer by co-extruding carboxylic acid-modified polypropylene (disposed on the barrier layer side; thickness: 23 μm) and homopolypropylene (innermost layer; thickness: 23 μm) onto a surface of the barrier layer on which the coating layer was not laminated. Thus, a battery packaging material including a laminated body including a coating layer having a two-layer structure (first coating layer/second coating layer), a barrier layer 4 and a sealant layer in this order was obtained.

<Resin Composition A2 Used for Formation of Second Coating Layer>
Thermosetting resin: 100 parts by mass
(main agent: urethane polyol having a molecular weight of 8000 to 50000 and a hydroxyl value of less than 40, curing agent: diphenylmethane diisocyanate adduct)
Curing accelerator: 1 part by mass
(imidazole compound that accelerates the crosslinking reaction of the thermosetting resin at 80 to 150° C.)
<Resin Composition A1 Used for Formation of First Coating Layer>
Thermosetting resin: 100 parts by mass
(main agent: aliphatic polyol having a molecular weight of 500 to 3000 and a hydroxyl value of 70 or more, curing agent: diphenylmethane diisocyanate adduct)
Curing accelerator: 1 part by mass
(octylic acid salt of 1,8-diazabicyclo[5.4.0]undec-7-ene)
Resin beads: a predetermined amount as shown in Tables 1B to 4B
(resin beads shown in Tables 1 to 4B)
Slipping agent: 1 part by mass
(erucic acid amide)
[Production of Battery Packaging Material 2]
Except that in formation of the first coating layer, a resin composition B1 having a composition as described below was used, the same method as described in [Production of Battery Packaging Material 1] was carried out to produce a battery packaging material.
<Resin Composition B1 Used for Formation of First Coating Layer>
Thermosetting resin: 100 parts by mass
(main agent: urethane polyol having a molecular weight of 8000 to 50000 and a hydroxyl value of less than 40, curing agent: diphenylmethane diisocyanate adduct)
Curing accelerator: 1 part by mass
(octylic acid salt of 1,8-diazabicyclo[5.4.0]undec-7-ene)
Resin beads: a predetermined amount as shown in Tables 1B to 4B
(resin beads shown in Tables 1B to 4B)

[Evaluation of Moldability]

Each battery packaging material obtained as described above was cut to prepare a strip piece of 120×80 mm, and the strip piece was used as a test sample. A straight mold including a rectangular male mold of 30×50 mm, and a female mold with a clearance of 0.5 mm from the male mold was provided, the test sample was placed on the female mold in such a manner that the thermally bondable resin layer was situated on the male mold side, the test sample was pressed at a pressing pressure (surface pressure) of 0.1 MPa with the molding depth set to various values, and cold molding (draw-in one-step molding) was performed. Presence/absence of pinholes and cracks in the metal layer in each of the molded test samples was checked, and the ratio of occurrence (%) of pinholes and cracks was calculated. For the ratio of occurrence of pinholes and cracks, a test sample having at least one pinhole or crack after being molded as described above was discriminated as a molding defective product, and the ratio of molding defective products occurring at the time of molding 100 test samples under the above-mentioned conditions was determined. The test was passed when the ratio of molding defective products was less than 5%, and the test was not passed when the ratio of molding defective products was 5% or more. Evaluation of moldability was similarly performed using as a control a battery packaging material produced in the same manner as described above except that resin beads were not added to the resin composition for forming the first coating layer. The obtained results were assessed in accordance with the following criteria, and the moldability improvement effect was evaluated.

(Assessment Criteria for Moldability Improvement Effect)

⊙: The molding depth where the test is passed increases by 1.0 mm or more as compared to the control.

○: The molding depth where the test is passed increases by 0.5 mm or more and less than 1.0 mm as compared to the control.

Δ: The molding depth where the test is passed is the same as that for the control.

x: The molding depth where the test is passed decreases as compared to the control.

[Evaluation Results]

The obtained results are shown in Tables 1B to 4B. As is evident from Tables 1B to 4B, when resin beads having no reactivity were added to the resin composition for forming one layer in the coating layer (Comparative Examples 1B to 4B), moldability was deteriorated as compared to a case where resin beads were not added. On the other hand, it has become apparent that when reactive resin beads are added to the resin composition for forming one layer in the coating layer, the molding depth can be increased, so that moldability is improved as compared to a case where resin beads are not added. When a curing accelerator was added to the resin composition for forming the coating layer, the adhesive layer was cured in an extremely short time of 30 seconds at 160° C., so that the lead time was considerably reduced (Examples 1B to 50B).

TABLE 1B

| | Type and added amount of resin beads used | | | | | Moldability improvement effect Resin composition used for formation of first coating layer | |
|---|---|---|---|---|---|---|---|
| | Constituent resin of beads | Type of functional group | Number of bonded functional groups (hydroxyl value, KOH mg/g) | Average particle size (μm) | Added amount (parts by mass) | Resin composition A1 | Resin composition B1 |
| Comparative Example 1B | Urethane | None | — | 6 | 0.3 | X | X |
| Comparative Example 2B | Urethane | None | — | 6 | 15 | X | X |
| Example 1B | Urethane | Hydroxyl group | 1 | 6 | 0.3 | ○ | ○ |
| Example 2B | Urethane | Hydroxyl group | 1 | 6 | 15 | ○ | ○ |
| Example 3B | Urethane | Hydroxyl group | 5 | 0.1 | 0.3 | ○ | ○ |
| Example 4B | Urethane | Hydroxyl group | 5 | 0.1 | 15 | ○ | ○ |
| Example 5B | Urethane | Hydroxyl group | 5 | 0.2 | 0.1 | ⊙ | ○ |
| Example 6B | Urethane | Hydroxyl group | 5 | 0.2 | 0.3 | ⊙ | ⊙ |
| Example 7B | Urethane | Hydroxyl group | 5 | 0.2 | 15 | ⊙ | ⊙ |
| Example 8B | Urethane | Hydroxyl group | 5 | 0.2 | 30 | ○ | ○ |
| Example 9B | Urethane | Hydroxyl group | 5 | 10 | 0.1 | ⊙ | ○ |
| Example 10B | Urethane | Hydroxyl group | 5 | 10 | 0.3 | ⊙ | ⊙ |
| Example 11B | Urethane | Hydroxyl group | 5 | 10 | 15 | ⊙ | ⊙ |
| Example 12B | Urethane | Hydroxyl group | 5 | 10 | 30 | ○ | ○ |
| Example 13B | Urethane | Hydroxyl group | 5 | 15 | 0.3 | ○ | ○ |
| Example 14B | Urethane | Hydroxyl group | 5 | 15 | 15 | ○ | ○ |
| Example 15B | Urethane | Hydroxyl group | 80 | 6 | 0.3 | ⊙ | ⊙ |
| Example 16B | Urethane | Hydroxyl group | 80 | 6 | 15 | ⊙ | ⊙ |
| Example 17B | Urethane | Hydroxyl group | 100 | 6 | 0.3 | ○ | ○ |
| Example 18B | Urethane | Hydroxyl group | 100 | 6 | 15 | ○ | ○ |

All of the resin beads made of urethane resin, which are shown in the table, have a refractive index of 1.5.

TABLE 2B

| | Type and added amount of resin beads used | | | | Moldability improvement effect Resin composition used for formation of first coating layer | |
|---|---|---|---|---|---|---|
| | Constituent resin of beads | Type of functional group | Number of bonded functional groups (content of NCO in resin beads, % by weight) | Average particle size (μm) | Added amount (parts by mass) | Resin composition A1 | Resin composition A1 |
| Example 19B | Urethane | NCO group | 3 | 0.1 | 0.3 | ○ | ○ |
| Example 20B | Urethane | NCO group | 3 | 0.1 | 15 | ○ | ○ |
| Example 21B | Urethane | NCO group | 3 | 0.2 | 0.1 | ○ | ○ |
| Example 22B | Urethane | NCO group | 3 | 0.2 | 0.3 | ⊙ | ⊙ |
| Example 23B | Urethane | NCO group | 3 | 0.2 | 15 | ⊙ | ⊙ |
| Example 24B | Urethane | NCO group | 3 | 0.2 | 30 | ○ | ○ |
| Example 25B | Urethane | NCO group | 3 | 10 | 0.1 | ○ | ○ |
| Example 26B | Urethane | NCO group | 3 | 10 | 0.3 | ⊙ | ⊙ |
| Example 27B | Urethane | NCO group | 3 | 10 | 15 | ⊙ | ⊙ |
| Example 28B | Urethane | NCO group | 3 | 10 | 30 | ○ | ○ |
| Example 29B | Urethane | NCO group | 3 | 15 | 0.3 | ○ | ○ |
| Example 30B | Urethane | NCO group | 3 | 15 | 15 | ○ | ○ |
| Example 31B | Urethane | NCO group | 8 | 6 | 0.3 | ⊙ | ⊙ |
| Example 32B | Urethane | NCO group | 8 | 6 | 15 | ⊙ | ⊙ |
| Example 33B | Urethane | NCO group | 10 | 6 | 0.3 | ○ | ○ |
| Example 34B | Urethane | NCO group | 10 | 6 | 15 | ○ | ○ |

All of the resin beads made of urethane resin, which are shown in the table, have a refractive index of 1.5.

TABLE 3B

| | Type and added amount of resin beads used | | | | Moldability improvement effect Resin composition used for formation of first coating layer | |
|---|---|---|---|---|---|---|
| | Constituent resin of beads | Type of functional group | Number of bonded functional groups (hydroxyl value, KOH mg/g) | Average particle size (μm) | Added amount (parts by mass) | Resin composition A1 | Resin composition A1 |
| Comparative Example 3B | Acrylic | None | — | 6 | 0.3 | X | X |
| Comparative Example 4B | Acrylic | None | — | 6 | 15 | X | X |
| Example 35B | Acrylic | Hydroxyl group | 1 | 6 | 0.3 | ○ | ○ |
| Example 36B | Acrylic | Hydroxyl group | 1 | 6 | 15 | ○ | ○ |
| Example 37B | Acrylic | Hydroxyl group | 5 | 6 | 0.3 | ⊙ | ⊙ |
| Example 38B | Acrylic | Hydroxyl group | 5 | 6 | 15 | ⊙ | ⊙ |
| Example 39B | Acrylic | Hydroxyl group | 80 | 6 | 0.3 | ⊙ | ⊙ |
| Example 40B | Acrylic | Hydroxyl group | 80 | 6 | 15 | ⊙ | ⊙ |
| Example 41B | Acrylic | Hydroxyl group | 100 | 6 | 0.3 | ○ | ○ |
| Example 42B | Acrylic | Hydroxyl group | 100 | 6 | 15 | ○ | ○ |

All of the resin beads made of acrylic resin, which are shown in the table, have a refractive index of 1.54.

TABLE 4B

| | Type and added amount of resin beads used | | | | Moldability improvement effect Resin composition used for formation of first coating layer | |
|---|---|---|---|---|---|---|
| | Constituent resin of beads | Type of functional group | Number of bonded functional groups (content of NCO in resin beads, % by weight) | Average particle size (μm) | Added amount (parts by mass) | Resin composition A1 | Resin composition A1 |
| Example 43B | Acrylic | NCO group | 1 | 6 | 0.3 | ○ | ○ |
| Example 44B | Acrylic | NCO group | 1 | 6 | 15 | ○ | ○ |
| Example 45B | Acrylic | NCO group | 3 | 6 | 0.3 | ⊙ | ⊙ |
| Example 46B | Acrylic | NCO group | 3 | 6 | 15 | ⊙ | ⊙ |
| Example 47B | Acrylic | NCO group | 8 | 6 | 0.3 | ⊙ | ⊙ |

TABLE 4B-continued

| | | Type and added amount of resin beads used | | | | Moldability improvement effect | |
|---|---|---|---|---|---|---|---|
| | | | Number of bonded functional groups | | Added | Resin composition used for formation of first coating layer | |
| | Constituent resin of beads | Type of functional group | (content of NCO in resin beads, % by weight) | Average particle size (μm) | amount (parts by mass) | Resin composition A1 | Resin composition A1 |
| Example 48B | Acrylic | NCO group | 8 | 6 | 15 | ⊙ | ⊙ |
| Example 49B | Acrylic | NCO group | 10 | 6 | 0.3 | ○ | ○ |
| Example 50B | Acrylic | NCO group | 10 | 6 | 15 | ○ | ○ |

All of the resin beads made of acrylic resin, which are shown in the table, have a refractive index of 1.54.

(2) Production and Evaluation of Battery Packaging Material Including Coating Layer Having a Three-Layer Structure-1

[Production of Battery Packaging Material 3]

A coating layer having a three-layer structure was formed on a barrier layer formed of an aluminum foil (thickness: 40 μm) subjected to a chemical conversion treatment at both surfaces. Specifically, a resin composition C3 having a composition as described below was applied to the barrier layer in such a manner that the thickness after curing was 5 μm, and the resin composition C3 was cured at 120° C. for 30 seconds to form a third coating layer. A resin composition C2 having a composition as described below was then applied onto the third coating layer in such a manner that the thickness after curing was 5 μm, and the resin composition C2 was cured at 120° C. for 30 seconds to form a second coating layer. Further, a resin composition C1 having a composition as described below was then applied onto the second coating layer in such a manner that the thickness after curing was 5 μm, and the resin composition C1 was cured at 120° C. for 30 seconds to form a first coating layer. The chemical conversion treatment of the aluminum foil used as the barrier layer was performed by applying to both the surfaces of the aluminum foil a treatment liquid including a phenol resin, a chromium fluoride compound and phosphoric acid using a roll coating method in such a manner that the application amount of chromium was 10 mg/m² (dry weight), and performing baking for 20 seconds under such conditions that the film temperature was 180° C. or higher.

Thereafter, a sealant layer including two layers was laminated on the barrier layer by co-extruding carboxylic acid-modified polypropylene (disposed on the barrier layer side; thickness: 23 μm) and homopolypropylene (innermost layer; thickness: 23 μm) onto a surface of the barrier layer on which the coating layer was not laminated. Thus, a battery packaging material including a laminated body including a coating layer having a three-layer structure (first coating layer/second coating layer/third coating layer), a barrier layer 4 and a sealant layer in this order was obtained.

<Resin Composition C3 Used for Formation of Third Coating Layer>

Thermosetting resin: 100 parts by mass
  (main agent: urethane polyol having a molecular weight of 8000 to 50000 and a hydroxyl value of less than 40, curing agent: diphenylmethane diisocyanate adduct)
Curing accelerator: 1 part by mass
  (octylic acid salt of 1,8-diazabicyclo[5.4.0]undec-7-ene)

<Resin Composition C2 Used for Formation of Second Coating Layer>

Thermosetting resin: 100 parts by mass
  (main agent: aliphatic polyol having a molecular weight of 500 to 3000 and a hydroxyl value of 70 or more, curing agent: isophorone diisocyanate)
Curing accelerator: 1 part by mass
  (imidazole compound that accelerates the crosslinking reaction of the thermosetting resin at 80 to 150° C.)
Resin beads: a predetermined amount as shown in Tables 5B to 8B
  (resin beads shown in Tables 5B to 8B)

<Resin Composition C1 Used for Formation of First Coating Layer>

Thermosetting resin: 100 parts by mass
  (main agent: phenol novolac-type epoxy resin having a molecular weight of 200 to 1000, curing agent: methylhexahydrophthalic acid anhydride)
Curing accelerator: 1 part by mass
  (octylic acid salt of 1,8-diazabicyclo[5.4.0]undec-7-ene)
Slipping agent: 1 part by mass
  (erucic acid amide)

[Production of Battery Packaging Material 4]

Except that in formation of the second coating layer, a resin composition D2 having a composition as described below was used, the same method as described in [Production of Battery Packaging Material 3] was carried out to produce a battery packaging material.

<Resin Composition D2 Used for Formation of Second Coating Layer>

Thermosetting resin: 100 parts by mass
  (main agent: phenol novolac-type epoxy resin having a molecular weight of 200 to 1000, curing agent: methylhexahydrophthalic acid anhydride)
Curing accelerator: 1 part by mass
  (octylic acid salt of 1,8-diazabicyclo[5.4.0]undec-7-ene)
Resin beads: a predetermined amount as shown in Tables 5B to 8B
  (resin beads shown in Tables 5B to 8B)

[Evaluation of Moldability]

The moldability improvement effect of each battery packaging material was evaluated under the same conditions as in "1. Production and evaluation of battery packaging material including coating layer having a two-layer structure".

[Evaluation Results]

The obtained results are shown in Tables 5B to 8B. From these results, it has been confirmed that when in a battery packaging material including a coating layer having a three-layer structure, reactive resin beads are added to a resin composition for forming one layer in the coating layer (Examples 51B to 100B), moldability is improved. On the other hand, when resin beads having no reactivity were added to the resin composition for forming one layer in the coating layer (Comparative Examples 5B to 8B), moldability was deteriorated. The results of this test shows that when a curing accelerator was added to the resin composition for forming the coating layer, the adhesive layer was cured in an extremely short time of 30 seconds at 160° C., so that the lead time was considerably reduced (Examples 51B to 100B).

TABLE 5B

| | Type and added amount of resin beads used | | | | | Moldability improvement effect Resin composition used for formation of second coating layer | |
|---|---|---|---|---|---|---|---|
| | Constituent resin of beads | Type of functional group | Number of bonded functional groups (hydroxyl value, KOH mg/g) | Average particle size (μm) | Added amount (parts by mass) | Resin composition C2 | Resin composition D2 |
| Comparative Example 5B | Urethane | None | — | 6 | 0.3 | X | X |
| Comparative Example 6B | Urethane | None | — | 6 | 15 | X | X |
| Example 51B | Urethane | Hydroxyl group | 1 | 6 | 0.3 | ○ | ○ |
| Example 52B | Urethane | Hydroxyl group | 1 | 6 | 15 | ○ | ○ |
| Example 53B | Urethane | Hydroxyl group | 5 | 0.1 | 0.3 | ○ | ○ |
| Example 54B | Urethane | Hydroxyl group | 5 | 0.1 | 15 | ○ | ○ |
| Example 55B | Urethane | Hydroxyl group | 5 | 0.2 | 0.1 | ⊙ | ○ |
| Example 56B | Urethane | Hydroxyl group | 5 | 0.2 | 0.3 | ⊙ | ⊙ |
| Example 57B | Urethane | Hydroxyl group | 5 | 0.2 | 15 | ⊙ | ⊙ |
| Example 58B | Urethane | Hydroxyl group | 5 | 0.2 | 30 | ○ | ○ |
| Example 59B | Urethane | Hydroxyl group | 5 | 10 | 0.1 | ⊙ | ○ |
| Example 60B | Urethane | Hydroxyl group | 5 | 10 | 0.3 | ⊙ | ⊙ |
| Example 61B | Urethane | Hydroxyl group | 5 | 10 | 15 | ⊙ | ⊙ |
| Example 62B | Urethane | Hydroxyl group | 5 | 10 | 30 | ○ | ○ |
| Example 63B | Urethane | Hydroxyl group | 5 | 15 | 0.3 | ○ | ○ |
| Example 64B | Urethane | Hydroxyl group | 5 | 15 | 15 | ○ | ○ |
| Example 65B | Urethane | Hydroxyl group | 80 | 6 | 0.3 | ⊙ | ⊙ |
| Example 66B | Urethane | Hydroxyl group | 80 | 6 | 15 | ⊙ | ⊙ |
| Example 67B | Urethane | Hydroxyl group | 100 | 6 | 0.3 | ○ | ○ |
| Example 68B | Urethane | Hydroxyl group | 100 | 6 | 15 | ○ | ○ |

All of the resin beads made of urethane resin, which are shown in the table, have a refractive index of 1.5.

TABLE 6B

| | Type and added amount of resin beads used | | | | | Moldability improvement effect Resin composition used for formation of second coating layer | |
|---|---|---|---|---|---|---|---|
| | Constituent resin of beads | Type of functional group | Number of bonded functional groups (content of NCO in resin beads, % by weight) | Average particle size (μm) | Added amount (parts by mass) | Resin composition C2 | Resin composition D2 |
| Example 69B | Urethane | NCO group | 3 | 0.1 | 0.3 | ○ | ○ |
| Example 70B | Urethane | NCO group | 3 | 0.1 | 15 | ○ | ○ |
| Example 71B | Urethane | NCO group | 3 | 0.2 | 0.1 | ○ | ○ |
| Example 72B | Urethane | NCO group | 3 | 0.2 | 0.3 | ⊙ | ⊙ |
| Example 73B | Urethane | NCO group | 3 | 0.2 | 15 | ⊙ | ⊙ |
| Example 74B | Urethane | NCO group | 3 | 0.2 | 30 | ○ | ○ |
| Example 75B | Urethane | NCO group | 3 | 10 | 0.1 | ○ | ○ |
| Example 76B | Urethane | NCO group | 3 | 10 | 0.3 | ⊙ | ⊙ |
| Example 77B | Urethane | NCO group | 3 | 10 | 15 | ⊙ | ⊙ |
| Example 78B | Urethane | NCO group | 3 | 10 | 30 | ○ | ○ |
| Example 79B | Urethane | NCO group | 3 | 15 | 0.3 | ○ | ○ |
| Example 80B | Urethane | NCO group | 3 | 15 | 15 | ○ | ○ |
| Example 81B | Urethane | NCO group | 8 | 6 | 0.3 | ⊙ | ⊙ |
| Example 82B | Urethane | NCO group | 8 | 6 | 15 | ⊙ | ⊙ |
| Example 83B | Urethane | NCO group | 10 | 6 | 0.3 | ○ | ○ |
| Example 84B | Urethane | NCO group | 10 | 6 | 15 | ○ | ○ |

All of the resin beads made of urethane resin, which are shown in the table, have a refractive index of 1.5.

TABLE 7B

| | Type and added amount of resin beads used | | | | | Moldability improvement effect Resin composition used for formation of second coating layer | |
|---|---|---|---|---|---|---|---|
| | Constituent resin of beads | Type of functional group | Number of bonded functional groups (hydroxyl value, KOH mg/g) | Average particle size (μm) | Added amount (parts by mass) | Resin composition C2 | Resin composition D2 |
| Comparative Example 7B | Acrylic | None | — | 6 | 0.3 | X | X |
| Comparative Example 8B | Acrylic | None | — | 6 | 15 | X | X |
| Example 85B | Acrylic | Hydroxyl group | 1 | 6 | 0.3 | ◯ | ◯ |
| Example 86B | Acrylic | Hydroxyl group | 1 | 6 | 15 | ◯ | ◯ |
| Example 87B | Acrylic | Hydroxyl group | 5 | 6 | 0.3 | ⊙ | ⊙ |
| Example 88B | Acrylic | Hydroxyl group | 5 | 6 | 15 | ⊙ | ⊙ |
| Example 89B | Acrylic | Hydroxyl group | 80 | 6 | 0.3 | ⊙ | ⊙ |
| Example 90B | Acrylic | Hydroxyl group | 80 | 6 | 15 | ⊙ | ⊙ |
| Example 91B | Acrylic | Hydroxyl group | 100 | 6 | 0.3 | ◯ | ◯ |
| Example 92B | Acrylic | Hydroxyl group | 100 | 6 | 15 | ◯ | ◯ |

All of the resin beads made of acrylic resin, which are shown in the table, have a refractive index of 1.54.

TABLE 8B

| | Type and added amount of resin beads used | | | | | Moldability improvement effect Resin composition used for formation of second coating layer | |
|---|---|---|---|---|---|---|---|
| | Constituent resin of beads | Type of functional group | Number of bonded functional groups (content of NCO in resin beads, % by weight) | Average particle size (μm) | Added amount (parts by mass) | Resin composition C2 | Resin composition D2 |
| Example 93B | Acrylic | NCO group | 1 | 6 | 0.3 | ◯ | ◯ |
| Example 94B | Acrylic | NCO group | 1 | 6 | 15 | ◯ | ◯ |
| Example 95B | Acrylic | NCO group | 3 | 6 | 0.3 | ⊙ | ⊙ |
| Example 96B | Acrylic | NCO group | 3 | 6 | 15 | ⊙ | ⊙ |
| Example 97B | Acrylic | NCO group | 8 | 6 | 0.3 | ⊙ | ⊙ |
| Example 98B | Acrylic | NCO group | 8 | 6 | 15 | ⊙ | ⊙ |
| Example 99B | Acrylic | NCO group | 10 | 6 | 0.3 | ◯ | ◯ |
| Example 100B | Acrylic | NCO group | 10 | 6 | 15 | ◯ | ◯ |

All of the resin beads made of acrylic resin, which are shown in the table, have a refractive index of 1.54.

(3) Production and Evaluation of Battery Packaging Material Including Coating Layer Having a Two-Layer Structure-2
[Production of Battery Packaging Material 5]
Except that a resin composition E1 having a composition as described below was used in formation of the first coating layer, and a resin composition E2 having a composition as described below was used in formation of the second coating layer, the same method as described in [Production of Battery Packaging Material 1] was carried out to produce a battery packaging material.
<Resin Composition E2 Used for Formation of Second Coating Layer>
Thermosetting resin: 100 parts by mass
 (main agent: urethane polyol having a molecular weight of 8000 to 50000 and a hydroxyl value of less than 40, curing agent: diphenylmethane diisocyanate adduct)
Curing accelerator: 1 part by mass
 (imidazole compound that accelerates the crosslinking reaction of the thermosetting resin at 80 to 150° C.)
Inorganic pigment: a predetermined amount as shown in Table 9B
 (carbon black having an average particle size of 0.2 μm)

<Resin Composition E1 Used for Formation of First Coating Layer>
Thermosetting resin: 100 parts by mass
 (main agent: aliphatic polyol having a molecular weight of 500 to 3000 and a hydroxyl value of 70 or more, curing agent: diphenylmethane diisocyanate adduct)
Curing accelerator: 1 part by mass
 (octylic acid salt of 1,8-diazabicyclo[5.4.0]undec-7-ene)
Resin beads: 0.3 parts by mass
 (made of urethane resin; containing a hydroxyl group as a functional group; number of bonded functional groups (hydroxyl value, KOH mg/g): 5; average particle size: 0.2 μm, refractive index: 1.5)
Inorganic pigment: a predetermined amount as shown in Table 9B
 (carbon black having an average particle size of 0.2 μm)
Slipping agent: 1 part by mass
 (erucic acid amide)
[Evaluation of Discriminability]
 For the obtained battery packaging materials and the battery packaging material of Example 6B (with the resin composition A1 used for formation of the first coating layer), the color tone on the coating layer side was visually observed to determine visibility of color (black) given by carbon black blended in the coating layer, and evaluation was performed in accordance with the following criteria.
(Evaluation Criteria of Discriminability)
A: The state of being black can be clearly visually recognized.
B: The state of being black can be slightly visually recognized.
C: The state of being black cannot be visually recognized.
[Evaluation of Molding Suitability]
For the obtained battery packaging materials and the battery packaging material of Example 6B (with the resin composition A1 used for formation of the first coating layer), molding was performed under the same conditions as described above, moldability, and the color tone of the stretched part after molding were evaluated in accordance with the following criteria.
(Moldability)
A: The molding depth where the test is passed is the same as that for the control battery packaging material.
B: The molding depth where the test is passed decreases by 0.5 mm or less as compared to that for the control battery packaging material.
C: The molding depth where the test is passed decreases by more than 0.5 mm and not more than 1.0 mm as compared to the control battery packaging material.
D: The molding depth where the test is passed decreases by more than 1.0 mm as compared to the control battery packaging material.
The battery packaging material of Example 6B (with the resin composition A1 used for formation of the first coating layer) was used as a control battery packaging material. The battery packaging materials of Examples 101B to 118B each have the same configuration as that of the battery packaging material of Example 6B (with the resin composition A1 used for formation of the first coating layer) except that the resin composition used for formation of the first coating layer contains carbon black.
(Color Tone of Stretched Part After Molding)
A: There is no difference in color tone between the stretched part and the non-stretched part.
B: There is a slight difference in color tone between the stretched part and the non-stretched part.
C: There is a clear difference in color tone between the stretched part and the non-stretched part.
[Evaluation Results]
The obtained results are shown in Table 9B. From these results, it has been confirmed that by adding an inorganic pigment (carbon black) to at least one layer that forms the coating layer, a color tone can be given to the battery packaging material to impart discriminability thereto. It has been also confirmed that when the amount of the inorganic pigment added is 30 parts by mass or less, particularly 15 parts by mass or less based on 100 parts by mass of the thermosetting resin, deterioration of moldability can be effectively suppressed. Further, it has become evident that by adding the inorganic pigment to both two layers that form the coating layer, occurrence of a difference in color tone between the molded part and the non-molded part after molding can be effectively suppressed. As a result of measuring the heat conductivity of the battery packaging material with carbon black contained in the coating layer, the battery packaging material had a heat conductivity of about 60 W/m·K or more, and was thus confirmed to have excellent heat dissipation property.

TABLE 9B

| | Amount of carbon black contained in each layer that forms coating layer (ratio based on 100 parts by mass of thermosetting resin in resin composition used for formation of each layer: parts by mass) | | | Molding suitability | |
|---|---|---|---|---|---|
| | Resin composition E2 | Resin composition E1 | Discriminability | Moldability | Color tone of stretched part |
| Example 6B | 0 | 0 | C | A | C |
| Example 101B | 1 | 0 | B | A | C |
| Example 102B | 3 | 0 | A | A | C |
| Example 103B | 5 | 0 | A | A | C |
| Example 104B | 15 | 0 | A | B | C |
| Example 105B | 20 | 0 | A | B | C |
| Example 106B | 30 | 0 | A | C | C |
| Example 107B | 0 | 1 | B | A | C |
| Example 108B | 0 | 3 | A | A | C |
| Example 109B | 0 | 5 | A | A | C |
| Example 110B | 0 | 15 | A | B | C |
| Example 111B | 0 | 20 | A | B | C |
| Example 112B | 0 | 30 | A | C | C |
| Example 113B | 1 | 1 | B | A | B |
| Example 114B | 3 | 3 | A | A | B |
| Example 115B | 5 | 5 | A | A | B |
| Example 116B | 15 | 15 | A | B | B |
| Example 117B | 20 | 20 | A | B | B |
| Example 118B | 30 | 30 | A | C | B |

(4) Production and Evaluation of Battery Packaging Material Including Coating Layer Having a Three-Layer Structure-2
[Production of Battery Packaging Material 6]

Except that a resin composition F1 having a composition as described below was used in formation of the first coating layer, a resin composition F2 having a composition as described below was used in formation of the second coating layer, and a resin composition F3 having a composition as described below was used in formation of the third coating later, the same method as described in [Production of Battery Packaging Material 3] was carried out to produce a battery packaging material.

<Resin Composition F3 Used for Formation of Third Coating Layer>
Thermosetting resin: 100 parts by mass
  (main agent: urethane polyol having a molecular weight of 8000 to 50000 and a hydroxyl value of less than 40, curing agent: diphenylmethane diisocyanate adduct)
Curing accelerator: 1 part by mass
  (octylic acid salt of 1,8-diazabicyclo[5.4.0]undec-7-ene)
Inorganic pigment: a predetermined amount as shown in Tables 10B and 11B
  (carbon black having an average particle size of 0.2 μm)

<Resin Composition F2 Used for Formation of Second Coating Layer>
Thermosetting resin: 100 parts by mass
  (main agent: aliphatic polyol having a molecular weight of 500 to 3000 and a hydroxyl value of 70 or more, curing agent: isophorone diisocyanate)
Curing accelerator: 1 part by mass
  (imidazole compound that accelerates the crosslinking reaction of the thermosetting resin at 80 to 150° C.)
Resin beads: 0.3 parts by mass
  (made of urethane resin; containing a hydroxyl group as a functional group; number of bonded functional groups (hydroxyl value, KOH mg/g): 5; average particle size: 0.2 μm, refractive index: 1.5)
Inorganic pigment: a predetermined amount as shown in Tables 10B and 11B
  (carbon black having an average particle size of 0.2 μm)

<Resin Composition F1 Used for Formation of First Coating Layer>
Thermosetting resin: 100 parts by mass
  (main agent: phenol novolac-type epoxy resin having a molecular weight of 200 to 1000, curing agent: methylhexahydrophthalic acid anhydride)
Curing accelerator: 1 part by mass
  (octylic acid salt of 1,8-diazabicyclo[5.4.0]undec-7-ene)
Inorganic pigment: a predetermined amount as shown in Tables 10B and 11B
  (carbon black having an average particle size of 0.2 μm)
Slipping agent: 1 part by mass
  (erucic acid amide)

[Evaluation of Discriminability and Molding Suitability]

For the obtained battery packaging materials and the battery packaging material of Example 56B (with the resin composition C2 used for formation of the second coating layer), the same method as described in "(3) Production and evaluation of battery packaging material including coating layer having a two-layer structure-2" to evaluate discriminability and molding suitability.

In evaluation of "moldability" in molding suitability, the battery packaging material of Example 56B (with the resin composition C2 used for formation of the second coating layer) was used as a control battery packaging material. The battery packaging materials of Examples 119B to 160B each have the same configuration as that of the battery packaging material of Example 56B (with the resin composition C2 used for formation of the second coating layer) except that the resin composition used for formation of the second coating layer contains carbon black.

[Evaluation Results]

The obtained results are shown in Tables 10B and 11B. From these results, it has been confirmed that by adding an inorganic pigment (carbon black) to at least one layer that forms the coating layer, a color tone can be given to the battery packaging material to impart discriminability thereto. It has been also confirmed that when the amount of the inorganic pigment added is 30 parts by mass or less, particularly 15 parts by mass or less based on 100 parts by mass of the thermosetting resin, deterioration of moldability can be effectively suppressed. Further, it has become evident that by adding the inorganic pigment to at least two layers, particularly three layers among the three layers that form the coating layer, occurrence of a difference in color tone between the molded part and the non-molded part after molding can be effectively suppressed. As a result of measuring the heat conductivity of the battery packaging material with carbon black contained in the coating layer, the battery packaging material had a heat conductivity of about 60 W/m·K or more, and was thus confirmed to have excellent heat dissipation property.

TABLE 10B

Amount of carbon black contained in each layer that forms coating layer
(ratio based on 100 parts by mass of thermosetting resin in resin composition used for formation of each layer: parts by mass)

| | Resin composition F3 | Resin composition F2 | Resin composition F1 | Discriminability | Molding suitability | |
|---|---|---|---|---|---|---|
| | | | | | Moldability | Color tone of stretched part |
| Example 56B | 0 | 0 | 0 | C | A | C |
| Example 119B | 3 | 0 | 0 | B | A | C |
| Example 120B | 5 | 0 | 0 | A | A | C |
| Example 121B | 15 | 0 | 0 | A | A | C |
| Example 122B | 20 | 0 | 0 | A | B | C |
| Example 123B | 30 | 0 | 0 | A | B | C |
| Example 124B | 35 | 0 | 0 | A | C | C |
| Example 125B | 0 | 3 | 0 | B | A | C |
| Example 126B | 0 | 5 | 0 | A | A | C |
| Example 127B | 0 | 15 | 0 | A | A | C |

TABLE 10B-continued

Amount of carbon black contained in each layer
that forms coating layer
(ratio based on 100 parts by mass of thermosetting
resin in resin composition used for formation of
each layer: parts by mass)

|  | Resin composition F3 | Resin composition F2 | Resin composition F1 | Discriminability | Molding suitability | |
|---|---|---|---|---|---|---|
|  |  |  |  |  | Moldability | Color tone of stretched part |
| Example 128B | 0 | 20 | 0 | A | B | C |
| Example 129B | 0 | 30 | 0 | A | B | C |
| Example 130B | 0 | 35 | 0 | A | C | C |
| Example 131B | 0 | 0 | 3 | B | A | C |
| Example 132B | 0 | 0 | 5 | A | A | C |
| Example 133B | 0 | 0 | 15 | A | A | C |
| Example 134B | 0 | 0 | 20 | A | B | C |
| Example 135B | 0 | 0 | 30 | A | B | C |
| Example 136B | 0 | 0 | 35 | A | C | C |

TABLE 11B

Amount of carbon black contained in each layer
that forms coating layer
(ratio based on 100 parts by mass of thermosetting
resin in resin composition used for formation of
each layer: parts by mass)

|  | Resin composition F3 | Resin composition F2 | Resin composition F1 | Discriminability | Molding suitability | |
|---|---|---|---|---|---|---|
|  |  |  |  |  | Moldability | Color tone of stretched part |
| Example 137B | 3 | 3 | 0 | B | A | B |
| Example 138B | 5 | 5 | 0 | A | A | B |
| Example 139B | 15 | 15 | 0 | A | A | B |
| Example 140B | 20 | 20 | 0 | A | B | B |
| Example 141B | 30 | 30 | 0 | A | B | B |
| Example 142B | 35 | 35 | 0 | A | C | B |
| Example 143B | 3 | 0 | 3 | B | A | B |
| Example 144B | 5 | 0 | 5 | A | A | B |
| Example 145B | 15 | 0 | 15 | A | A | B |
| Example 146B | 20 | 0 | 20 | A | B | B |
| Example 147B | 30 | 0 | 30 | A | B | B |
| Example 148B | 35 | 0 | 35 | A | C | B |
| Example 149B | 0 | 3 | 3 | B | A | B |
| Example 150B | 0 | 5 | 5 | A | A | B |
| Example 151B | 0 | 15 | 15 | A | A | B |
| Example 152B | 0 | 20 | 20 | A | B | B |
| Example 153B | 0 | 30 | 30 | A | B | B |
| Example 154B | 0 | 35 | 35 | A | C | B |
| Example 155B | 3 | 3 | 3 | B | A | A |
| Example 156B | 5 | 5 | 5 | A | A | A |
| Example 157B | 15 | 15 | 15 | A | A | A |
| Example 158B | 20 | 20 | 20 | A | B | A |
| Example 159B | 30 | 30 | 30 | A | B | A |
| Example 160B | 35 | 35 | 35 | A | C | A |

DESCRIPTION OF REFERENCE SIGNS

1: Coating layer
1a: First coating layer
1b: Second coating layer
1c: Third coating layer
2: Barrier layer
3: Sealant layer

The invention claimed is:

1. A battery packaging material which comprises a laminated body including at least a coating layer, a barrier layer and a sealant layer in this order, wherein
the coating layer is provided directly on the barrier layer,
the coating layer has a multilayer structure having two or more layers, and
the layers that form the coating layer are each formed of a cured product of a resin composition containing a thermosetting resin and a curing accelerator.

2. The battery packaging material according to claim 1, wherein the layers that form the coating layer each have an elastic modulus of 1500 to 6000 MPa.

3. The battery packaging material according to claim 1, wherein at least one of the layers that form the coating layer has an elastic modulus of 2500 to 6000 MPa.

4. The battery packaging material according to claim 1, wherein the coating layer has a two-layer structure, and among the layers that form the coating layer, the layer that is in contact with the barrier layer has an elastic modulus of 1500 to 6000 MPa, and the outermost layer has an elastic modulus of 3000 to 6000 MPa.

5. The battery packaging material according to claim 1, wherein the coating layer has a three-layer structure, and among the layers that form the coating layer, the layer that is in contact with the barrier layer has an elastic modulus of 1500 to 6000 MPa, the layer positioned in the middle between the layer that is in contact with the barrier layer and the outermost layer has an elastic modulus of 1500 to 6000 MPa, and the outermost layer has an elastic modulus of 3000 to 6000 MPa.

6. The battery packaging material according to claim 1, wherein in the coating layer, the outermost layer is formed of a cured product of a resin composition containing a thermosetting resin, a curing accelerator and a slipping agent.

7. The battery packaging material according to claim 1, wherein the resin composition to be used for formation of at least one layer in the coating layer contains a pigment and/or dye.

8. The battery packaging material according to claim 7, wherein the resin composition to be used for formation of at least one layer in the coating layer contains an inorganic pigment.

9. The battery packaging material according to claim 1, wherein the layers that form the coating layer each have a thickness of 1 to 5 μm.

10. The battery packaging material according to claim 1, wherein the battery packaging material has a thickness of 40 to 120 μm as a whole.

11. The battery packaging material according to claim 1, wherein the thermosetting resin is at least one selected from the group consisting of an epoxy resin, an amino resin, an acrylic resin, a urethane resin, a phenol resin, an unsaturated polyester resin and an alkyd resin.

12. The battery packaging material according to claim 1, wherein the curing accelerator is at least one selected from the group consisting of an amidine compound, a carbodiimide compound, a ketimine compound, a hydrazine compound, a sulfonium salt, a benzothiazolium salt and a tertiary amine compound.

13. A battery comprising a battery element which includes at least a positive electrode, a negative electrode and an electrolyte, the battery element being stored in the battery packaging material according to claim 1.

14. A method for producing a battery packaging material, the method comprising a coating layer forming step of applying a resin composition, which contains a thermosetting resin and a curing accelerator, to a barrier layer and heating and thereby curing the resin composition repeatedly two or more times to form on the barrier layer a coating layer having a multilayer structure having two or more layers, wherein before, during or after the coating layer forming step, a sealant layer is laminated on a surface of the barrier layer on a side opposite to a surface on which the coating layer is laminated.

15. A battery packaging material which comprises a laminated body including at least a coating layer, a barrier layer and a sealant layer in this order, wherein the coating layer includes a single layer or multiple layers formed of a cured product of a resin composition containing a thermosetting resin and a curing accelerator, and the resin composition to be used for formation of at least one layer in the coating layer contains reactive resin beads.

16. A battery packaging material according to claim 15, wherein the coating layer has a three-layer structure in which a first coating layer, a second coating layer and a third coating layer are arranged in this order from the outermost surface side toward the barrier layer side, and the resin composition to be used for formation of the second coating layer contains the reactive resin beads.

17. The battery packaging material according to claim 15, wherein the reactive resin beads are urethane resin beads or acrylic resin beads having a functional group.

18. The battery packaging material according to claim 15, wherein the refractive index of the reactive resin beads is 1.3 to 1.8.

19. The battery packaging material according to claim 16, wherein the resin composition to be used for formation of at least one layer in the coating layer contains a pigment and/or dye.

20. The battery packaging material according to claim 19, wherein the resin composition to be used for formation of at least one layer in the coating layer contains an inorganic pigment.

21. The battery packaging material according to claim 15, wherein the thermosetting resin is at least one selected from the group consisting of an epoxy resin, an amino resin, an acrylic resin, a urethane resin, a phenol resin, an unsaturated polyester resin and an alkyd resin.

22. The battery packaging material according to claim 15, wherein the curing accelerator is at least one selected from the group consisting of an amidine compound, a carbodiimide compound, a ketimine compound, a hydrazine compound, a sulfonium salt, a benzothiazolium salt and a tertiary amine compound.

23. The battery packaging material according to claim 15, wherein the barrier layer is a metal foil.

24. The battery packaging material according to claim 13, wherein the battery packaging material has a thickness of 40 to 120 μm as a whole.

25. A method for producing a battery packaging material, the method comprising a coating layer forming step of applying a resin composition, which contains a thermosetting resin and a curing accelerator, onto a barrier layer and heating and thereby curing the resin composition, wherein the coating layer forming step is carried out one or more times, and the resin composition containing reactive resin beads is used at least one time in the coating layer forming step, and before or after the coating layer forming step, a sealant layer is laminated on a surface of the barrier layer on a side opposite to a surface on which the coating layer is laminated.

26. A battery comprising a battery element including at least a positive electrode, a negative electrode and an electrolyte, the battery element being stored in the battery packaging material according to claim 15.

* * * * *